(12) United States Patent
Hayashi et al.

(10) Patent No.: US 7,114,854 B2
(45) Date of Patent: Oct. 3, 2006

(54) THRUST ROLLER BEARING AND CAGE

(75) Inventors: Tetsuya Hayashi, Iwata (JP); Kousuke Obayashi, Iwata (JP); Shinji Oishi, Iwata (JP)

(73) Assignee: NTN Corporation, Osaka (JP)

( * ) Notice: Subject to any disclaimer, the term of this patent is extended or adjusted under 35 U.S.C. 154(b) by 153 days.

(21) Appl. No.: 10/701,452

(22) Filed: Nov. 6, 2003

(65) Prior Publication Data

US 2004/0091192 A1 May 13, 2004

(30) Foreign Application Priority Data

| Nov. 7, 2002 | (JP) | ............................. 2002-323867 |
| Nov. 7, 2002 | (JP) | ............................. 2002-323926 |
| Nov. 7, 2002 | (JP) | ............................. 2002-324293 |

(51) Int. Cl.
*F16C 33/46* (2006.01)

(52) U.S. Cl. ...................................... 384/623; 384/625

(58) Field of Classification Search ................ 384/623, 384/621, 614, 572, 619, 625
See application file for complete search history.

(56) References Cited

U.S. PATENT DOCUMENTS

| 2,591,160 A | 4/1952 | Kilian |
| 4,225,200 A | 9/1980 | Dougall |
| 5,064,298 A | 11/1991 | Hibi et al. |
| 5,630,668 A | 5/1997 | Ikezawa et al. |
| 5,641,038 A | 6/1997 | Akamatsu |
| 5,848,846 A | 12/1998 | Sugiyama et al. |
| 6,431,761 B1 | 8/2002 | Yamaguchi et al. |

FOREIGN PATENT DOCUMENTS

| DE | 919 977 C | 11/1954 |
| DE | 10 99 809 B | 2/1961 |
| DE | 41 30 227 A1 | 9/1992 |
| DE | 195 29 379 A1 | 5/1996 |
| DE | 196 18 065 A1 | 11/1997 |
| DE | 198 25 431 A | 12/1999 |
| EP | 0 657 658 A1 | 12/1994 |
| FR | 1 281 684 A | 1/1962 |
| GB | 444292 | 3/1936 |
| JP | 272529 | * 10/1993 |
| JP | 2000-97242 | 4/2000 |
| JP | 2002-195266 | 12/2000 |
| JP | 2002-70872 | 3/2002 |
| JP | 2002-070872 | 3/2002 |

OTHER PUBLICATIONS

Metal Handbook, Edited by The Japan Institute of Metals, Published by Maruzen Co., Ltd., Method of Surface Hardening Treatment of Steel, pp. 550-552, Publication Date: Mar. 31, 1990 (Partial English Translation).

* cited by examiner

*Primary Examiner*—Lenard A. Footland
(74) *Attorney, Agent, or Firm*—McDermott Will & Emery LLP

(57) ABSTRACT

An object is to provide a cage and a thrust roller bearing with improved oil passage performance of a lubricating oil in the inside of a bearing while holding a needle roller in a stable manner so as to ensure excellent durability. The thrust roller bearing includes a needle roller and a cage holding the needle roller in pockets for accommodating the same. A length La of a roller holding portion provided in the pocket is set to be within a range of 30% to 80% of a length in a radial direction of the pocket.

21 Claims, 13 Drawing Sheets

$$La = \sum_i La_i$$

$$La = \sum_i La_i$$

FIG.7A
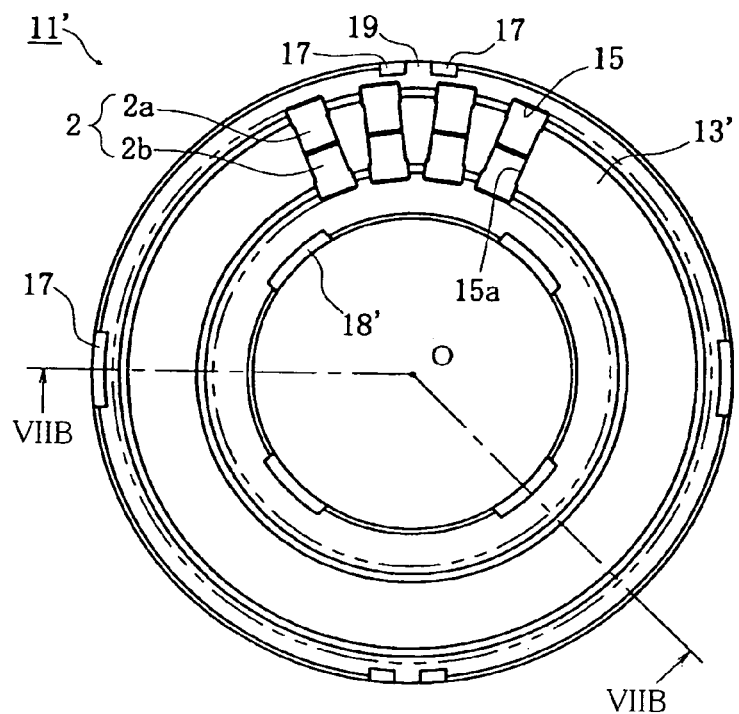
FIG.7B
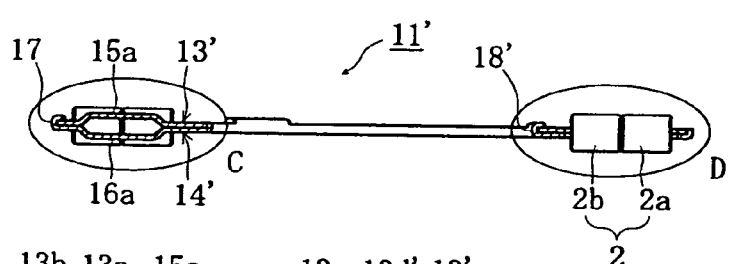
FIG.7C
FIG.7D
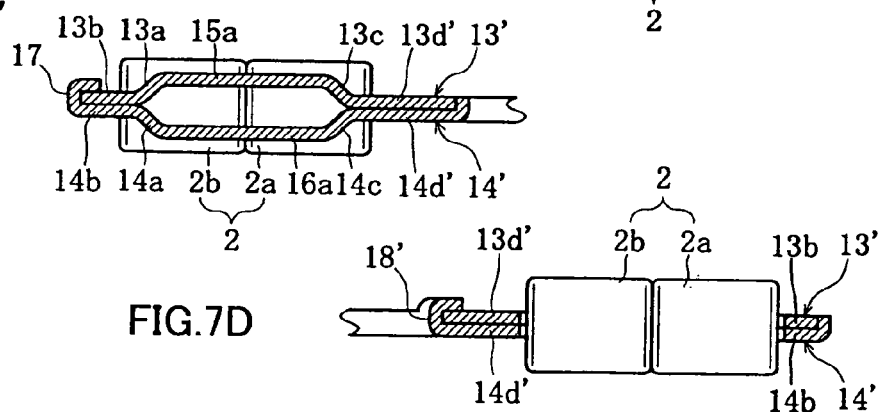

CASE DEPTH 90 μm
(WITHOUT CRACK)

CASE DEPTH 100 μm

CRACK

NOTE: AN END FACE 5c (6c) HAVING A RECESS
IN ITS CENTRAL PORTION IS INCLUDED.

THRUST ROLLER BEARING AND CAGE

BACKGROUND OF THE INVENTION

1. Field of the Invention

The present invention relates to a thrust roller bearing used in an automatic transmission and a compressor in an automobile, as well as to a cage used therein.

2. Description of the Background Art

A thrust roller bearing is constituted of a needle roller, a cage and a roller bearing ring, and has such a structure that the needle roller and the roller bearing ring are in line contact. Accordingly, high load-carrying capacity and high rigidity can be obtained for a small bearing projected area. As such, the thrust roller bearing is suitable as a bearing used in a harsh condition of use, such as poor lubrication or high-speed rotation, and widely used as a bearing for an automatic transmission or a bearing for a compressor of an air-conditioner in an automobile, for example.

FIG. 15A shows a roller holding portion provided in a pocket for accommodating a conventional needle roller. FIG. 15A shows a single-row roller, while FIG. 15B shows a multiple-row roller. Referring to these figures, in a cage, a pocket 105 accommodating needle rollers 102, 102a, 102b has a length Lp slightly larger than a length L of the needle roller. A roller holding portion 105a is provided on a periphery of a window in parallel to a central axis of the pocket, and projects toward the needle roller side above the needle roller axis. Here, roller holding portion 105a is provided on an entire periphery of the window in parallel to the axis. In such an arrangement of the roller holding portion, opening area, that is, a gap is inevitably small, and performance of oil passage to the inside of the cage is not sufficient.

As such, in order to increase an amount of passage of a lubricating oil per unit time, a thrust roller bearing as shown in FIGS. 16A to 16C has been proposed (Japanese Patent Laying-Open No. 2002-70872). In FIGS. 16A to 16C, a thrust roller bearing 50 includes a needle roller 80 and two annular cages 60, 70. Two cages 60, 70 are arranged so as to sandwich the needle roller from above and below, and have a window 61 of the upper cage and a window 71 of the lower cage respectively. Here, windows have a length larger than the roller length in a radial direction respectively. Roller holding portions 64, 74 formed in such plurality of windows sandwich and hold a plurality of needle rollers 80. In two cages 60, 70, roller holding portions 64, 74 have a length la in the radial direction shorter than a roller length l. In addition, at least one of two cages 60, 70 is bent so that at least one of thickness t1 of a radially outer portion 62 (72) and thickness t2 of a radially inner portion 63 (73) of the roller holding portion is made smaller than thickness t0 of the roller holding portion.

In this manner, a gap is enlarged in at least one of the radially outer portion and the radially inner portion having a thickness smaller than the roller holding portion. Accordingly, flow-in performance or flow-out performance of the lubricating oil passing through the gap is improved, and an amount of lubricating oil passing through the bearing per unit time can be increased. In addition, blocking by the cage of passage of the lubricating oil does not tend to occur, and stay of the lubricating oil is prevented. Consequently, temperature increase in the oil can be suppressed, thereby improving durability of the bearing. In the example above, in two cages 60, 70, outer plate portions 62, 72 are superposed, innermost portions 67, 77 of inner plate portions 63, 73 are bent in such a direction that they are superposed, and innermost portion 67 of inner plate portion 63 is caulked. In this manner, two cages 60, 70 are integrally fixed.

Though not limited to the thrust roller bearing, falling of a needle roller must not occur in particular in the thrust roller bearing under a condition of use in which the thrust roller bearing is operated under high load and in high speed. If the length of the roller holding portion is made smaller in the above-described thrust roller bearing, however, it will be difficult to hold the needle roller in a stable manner and falling of the needle roller from the cage may take place, though probability is low. In other words, improvement in the amount of oil passage of the lubricating oil results in a possibility of occurrence of falling of the needle roller, though probability is low. Hence, development of a thrust roller bearing free from falling of a needle roller while securing the oil passage performance of the lubricating oil has been demanded.

In addition, in the thrust roller bearing described above, the roller is pressed against the outer diameter side by centrifugal force during rotation. Therefore, unless an end face on the radially outer side of the pocket of the cage has a hardness and a case depth higher than a prescribed level, abrasion may occur, which will lead to breakage. Though it is possible to form a hardened case in the cage with heat treatment such as quenching, deformation by heat may occur due to quenching or the like. Accordingly, in order to prevent deformation of the cage due to heat treatment, prevention of deformation due to heat treatment by forming a corrugated portion in a cage has been proposed (Japanese Patent Laying-Open No. 2000-097242).

Even with the cage having a shape for preventing deformation due to heat treatment described above, however, if the case depth is too large, the cage tends to be embrittled, and a crack or the like may be produced during working or in use, resulting in breakage. In particular, in order to increase the thickness of the hardened case from a worked face, a time period for treatment should be extended, leading to cost increase. Therefore, development of a thrust roller bearing having a cage capable of overcoming the above-described problems as well as such a cage has been desired.

Moreover, in the conventional thrust roller bearing, an end face of the roller is pressed against the wall surface of the window by the centrifugal force. Furthermore, because of the contact caused by rotation of the needle roller, abnormal abrasion (hereinafter, referred to as "drilling abrasion") is caused in the window. In addition, bearing noise has been large. As the thrust needle bearing is mainly used in an automobile, in recent days when quietness within a car is demanded, lowering of the bearing noise in the thrust roller bearing has also been demanded.

SUMMARY OF THE INVENTION

An object of the present invention is to provide a thrust roller bearing having improved oil passage performance of a lubricating oil in the inside of a bearing while holding a needle roller in a stable manner, as well as a cage.

According to a thrust roller bearing of the present invention different from the thrust roller bearing of the invention above, a cage having a hardened case so as not to cause a crack during working and in use, while suppressing abrasion and attaining a short time period for treatment, as well as a thrust roller bearing incorporating the cage are provided.

According to a thrust roller bearing of the present invention different from the two thrust roller bearings in the invention above, a thrust roller bearing unlikely to suffer from drilling abrasion and attaining lower bearing noise is provided.

The above-described thrust roller bearings are in common in higher durability, and the object of each thrust roller bearing is summarized as improvement in durability. The thrust roller bearing and the cage according to the present invention do not necessarily satisfy all of the three individual objects, but should only satisfy any one of those three objects. It goes without saying that two or more of the three objects above may be satisfied.

A thrust roller bearing according to the present invention includes a needle roller, a cage holding the needle roller in a pocket for accommodating the needle roller, and a pair of roller bearing rings in contact with the needle roller so as to sandwich the needle roller and the cage. A roller holding portion provided in the pocket has a length within a range of 30% to 80% of a length in a radial direction of the pocket.

With such a structure, while attaining a function to hold the needle roller, oil passage performance to the inside of the bearing can be improved and the life of the bearing can be extended. If the roller holding portion has the length less than 30% of the length in the radial direction of the pocket, it is difficult to hold the needle roller in a stable manner. On the other hand, if the roller holding portion has the length more than 80% of the length in the radial direction of the pocket, passage of the lubricating oil is blocked and the oil passage performance is deteriorated. Therefore, long-time use will cause temperature increase in the lubricating oil, resulting in deterioration in durability of the thrust roller bearing. From the viewpoint of ensured holding of the needle roller, it is more preferable for the roller holding portion to have a length not smaller than 40% of the length in the radial direction of the pocket. From the viewpoint of improvement in the oil passage performance, it is more preferable for the roller holding portion to have a length not larger than 70% of the length in the radial direction of the pocket.

Though the roller holding portion described above is usually formed in a symmetrical manner, it may be formed asymmetrically. In other words, a shape of the roller holding portion formed on a right periphery and a shape of the roller holding portion formed on a left periphery of the window of the pocket may not be symmetrical with respect to the central axis of the window of the pocket. In this case, with regard to the roller holding portions on both sides, a length of one roller holding portion having a smaller length in the radial direction (if the roller holding portion is divided into a plurality of sections, one having smaller total length) is set to be not smaller than 30% of the length in the radial direction of the pocket, and a length of the other roller holding portion having a larger length in the radial direction (if the roller holding portion is divided into a plurality of sections, one having larger total length) is set to be not larger than 80% of the length in the radial direction of the pocket. That is, 0.3×(length in the radial direction of the pocket: Lp)≦Min (roller holding portion (right side), roller holding portion (left side)), and Max (roller holding portion (right side), roller holding portion (left side))≦0.8×Lp.

The roller holding portion described above is constituted of a plurality of roller holding portions. The roller holding portion may be structured so that the total length of the plurality of roller holding portions is within a range of 30% to 80% of the length in the radial direction of the pocket.

By implementing the roller holding portion with the plurality of roller holding portions separate from each other, between two opposing factors of holding the roller and securing the oil passage performance, for example, the oil passage performance can be maximized on a presumption that minimum holding of the roller is attained in view of practical use. The plurality of roller holding portions may be adapted to a multiple-row roller for example, or alternatively, they may be adapted to a single-row roller. In addition, by implementing an arrangement of the plurality of roller holding portions, in addition to improving the oil passage performance, the roller can be held and guided over a larger length. Thus, stable rotation can be achieved.

The needle roller described above may be constituted of multiple roller rows, and a roller holding portion having a length smaller than that of the needle roller may be provided in respective one of multiple roller rows.

With such a structure, in an example of a multiple-row roller, an arrangement of the roller holding portion in which minimum holding of the roller in each row of the multiple rows is satisfied, and oil passage performance of the lubricating oil to the roller in each row of the multiple rows is maximized, can be achieved.

The needle roller may be constituted of multiple roller rows, and the multiple-row needle roller may be held by one common roller holding portion. With such a structure, a process for forming the roller holding portion is simplified.

Another thrust roller bearing according to the present invention includes a plurality of rollers, and a cage made of metal and holding the roller so as to sandwich the same with an upper member (upper cage) and a lower member (lower cage). A nitrocarburized case is formed to a depth in a range larger than 3 μm and smaller than 100 μm in a surface of the cage.

With such a structure, the depth of the nitrocarburized case of the cage is set to be within a prescribed range. Thus, while abnormal abrasion in the cage during use is suppressed, occurrence of a crack in a caulked portion in a process of manufacturing and assembling the thrust roller bearing can be avoided. If the depth of the nitrocarburized case in the surface portion is equal to or less than 3 μm, the abnormal abrasion described above cannot be avoided. On the other hand, if the depth of the nitrocarburized case in the surface portion is equal to or larger than 100 μm, a crack may be produced in the caulked portion in caulking during assembly of the cage. More desirably, the depth of the nitrocarburized case is in a range of not smaller than 5 μm and not larger than 50 μm.

The depth of the nitrocarburized case described above may be (A1) a depth of a degraded layer observed with an optical microscope after polishing and lightly etching the profile section. Alternatively, the depth of the nitrocarburized case may be (A2) a distance from the surface in a position having a hardness substantially equal to the inside hardness, which hardness is measured in a prescribed pitch, for example, a pitch of 0.5 μm, from the surface. The depth of the nitrocarburized case found by using at least one of the measurement methods of (A1) and (A2) should only be within the range described above. It is to be noted that the nitrocarburized case described above is also formed on the surface of a thin steel plate material, or on an end surface formed by providing an opening in the thin steel plate.

The nitrocarburized case described above may be replaced by any surface hardening treatment described below. Alternatively, it may be replaced with a hardened case replaced by a hardening treatment other than the treatment described below. The hardened case is formed not only on a flat surface of the thin plate material but also on an end face formed by providing a window in the cage (section profile of a thickness of the thin plate material).

Yet another thrust roller bearing according to the present invention includes a roller, and a cage holding the roller so as to sandwich the same with an upper member (upper cage) and a lower member (lower cage). In the cage, a nitrocarburized case is formed to a depth in a range larger than 3 µm and smaller than 100 µm in its surface. The upper member and the lower member are superposed and bent in at least one of a radially outer end portion and a radially inner end portion thereof, and subjected to caulking. The nitrocarburized case plastically deforms in the caulked portion.

With such a structure, after the upper member and the lower member of the cage are subjected to press working for providing a pocket and for opening a window in the pocket for example, the upper member and the lower member are subjected to nitrocarburizing treatment, to form a hardened case on the surface. After the nitrocarburized case is formed, the roller is set in the pocket. Then, the upper member and the lower member can be superposed and bent, and subjected to caulking. In the process described above, for example, it is not necessary to subject the superposed and bent portion to softening or the like, thereby simplifying the manufacturing process. The process can thus be simplified because the upper member and the lower member can be subjected to caulking with the nitrocarburized case present, which resulted from the fact that a depth of the nitrocarburized case has been set to be smaller than 100 µm.

The fact that the nitrocarburized case has been bent can be verified by observation with naked eyes or an optical microscope after polishing and lightly etching that portion. It is possible to observe that the nitrocarburized case has plastically deformed.

The nitrocarburized case described above can be formed in a following manner. In the nitrocarburizing treatment, nitriding with low surface nitrogen concentration is performed with such a method as: (a1) a method of immersing a cage into molten salt having lowered nitriding capability, which molten salt is NaCNO obtained by blowing air into NaCN in advance; or (a2) a method of carbo-nitriding in an atmosphere obtained by adding ammonia ($NH_3$) to carburization gas. Whereas the surface hardness attains to approximately Hv 1200 in a case of normal nitriding, the hardness of the nitrocarburized case is not as high as that. In spite of this fact, compressive stress remains on the surface, and fatigue strength is improved.

The nitrocarburized case described above can be replaced by a hardened case hardened with a different method. For example, it may be replaced with a hardened case formed by heat treatment including quenching treatment. By setting the percentage of content of an alloying element such as carbon, silicon or manganese to be within an appropriate range in a composition of steel, a prescribed quench hardening capability is ensured, and a quench hardened structure of martensite or bainite can be formed on the surface portion. Such a structure may be quenched by heating only the surface portion with high-frequency heating or laser heating, or may be quenched by uniform heating of the entire body. After such quenching, tempering may or may not be applied.

The nitrocarburized case described above may be replaced with a hardened case formed by at least one treatment of carburization treatment, carbo-nitriding treatment, ion nitriding treatment, quenching treatment, and working treatment.

The method of carburization treatment described above includes pack carburizing, liquid carburizing, and gas carburizing. For example, gas carburizing is performed in the following manner. Air is mixed with methane ($CH_4$), ethane ($C_2H_5$), propane ($C_3H_8$) or the like, which is in turn decomposed using Ni catalyst, resulting in production of $H_2O$. Thus produced $H_2O$ is then removed so as to obtain an endothermic gas (also referred to as an "end gas" or an "RX gas") having a composition of approximately 20% of CO, approximately 40% of $H_2$, and approximately 40% of $N_2$. An object to be treated is heated in this endothermic gas, carburized, and directly quenched. In order to enhance the carburization capability, $CH_4$ may be added to the above-described gas, for example.

Ion nitriding treatment is performed in the following manner. A treatment chamber is evacuated to a vacuum, and an atmosphere containing $N_2$ or $NH_3$ of several hundred Pa is set. Then, the object to be treated is placed as a cathode and applied with a direct voltage of 300 to 1000V so as to cause glow discharge. While the surface of the object to be treated is heated, N is diffused for permeation.

As a method of hardening treatment in the present invention, any method of hardening treatment described in "Metal Handbook" (edited by The Japan Institute of Metals, Maruzen Co. Ltd., Method of Surface Hardening Treatment of Steel, pp.550–552), for example, may be used.

As the thrust roller bearing described above has a roller bearing ring, a more compact bearing can be implemented. In addition, by employing a roller which has been subjected to carbo-nitriding treatment as the roller described above, a thrust roller bearing with more excellent durability can be implemented. Moreover, by implementing the roller with the multiple-row roller, slippage between the roller and the roller bearing ring for example, caused by a difference in linear speed between the radially inner side and the radially outer side during rotation of the bearing can be mitigated. Consequently, durability can be improved.

A thrust roller bearing different from those described above in the present invention includes a plurality of rollers, and an annular cage having a plurality of pockets for holding the rollers respectively. An end face of each of the plurality of rollers is an F end face, and end face accuracy is at most 30 µm. In this manner, frictional resistance between the roller and the cage as well as frictional resistance between the roller and an adjacent roller are significantly made smaller. Consequently, drilling abrasion due to friction when these elements collide with each other is in particular unlikely. Moreover, the bearing noise produced by the sound when these elements collide with each other is in particular lowered.

The roller includes a needle roller, a long cylindrical roller, and a cylindrical roller. Based on the regulation under JIS (Japanese Industrial Standards), a needle roller refers to a roller having a diameter smaller than 5 mm and a length 3 to 10 times the diameter; a long cylindrical roller refers to a roller having a diameter not smaller than 5 mm and not larger than 15 mm and a length 3 to 10 times the diameter; and a cylindrical roller refers to a roller having a length less than 3 times the diameter.

It has been found in the present invention that the problem in the conventional thrust roller bearing that the drilling abrasion is likely and the bearing noise is large has been caused by factors below. When the end face accuracy in each needle roller used in the thrust roller bearing is large, frictional resistance in a contact portion of the needle roller with the cage becomes large. Therefore, drilling abrasion is caused by friction when these elements collide with each other, and also the bearing noise is made larger by the sound produced by the friction when these elements collide. In particular, in the multiple-row thrust roller bearing, the end faces of the rollers contact with each other. Accordingly, poor end face accuracy of the roller tends to raise a value for the bearing noise. In addition, the inventors of the subject application have found that the drilling abrasion and the bearing noise can significantly be improved by providing the end face of the roller with a prescribed shape and setting the end face accuracy to not larger than 30 μm in the thrust roller bearing.

In the thrust roller bearing according to the present invention, preferably, each of the plurality of rollers is arranged in each of the plurality of pockets in a single row in a radial direction of the cage.

In this manner, frictional resistance between the roller and the cage is made smaller. Consequently, the bearing noise produced by the sound when the roller and the cage collide with each other is in particular lowered. Moreover, drilling abrasion due to friction when these elements collide with each other is in particular unlikely.

In the thrust roller bearing according to the present invention, preferably, each of the plurality of rollers is arranged in each of the plurality of pockets in multiple rows in a radial direction of the cage.

In this manner, frictional resistance between the roller and the cage or an adjacent roller is made smaller. Consequently, the bearing noise produced by the sound when the roller collides with the adjacent roller is in particular lowered. Moreover, drilling abrasion due to friction when these elements collide with each other is in particular unlikely. In addition, a difference in a peripheral speed of revolution between the radially outer side portion and the radially inner side portion of the roller is made smaller, thereby suppressing slipping with respect to a raceway surface (not shown). In this manner, heating at a contact portion is reduced, and surface damage (smearing) of the needle roller is prevented.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 7A is a plan view showing a thrust roller bearing in Embodiment 4 of the present invention.

FIG. 7B is a cross-sectional view along the line VIIB-O-VIIB in FIG. 7A.

FIG. 7C is an enlarged view of portion C in FIG. 7B.

FIG. 7D is an enlarged view of portion D in FIG. 7B.

DESCRIPTION OF THE PREFERRED EMBODIMENTS

In the following, embodiments of the present invention will be described with reference to the figures.

(Embodiment 1)

Figure 1:
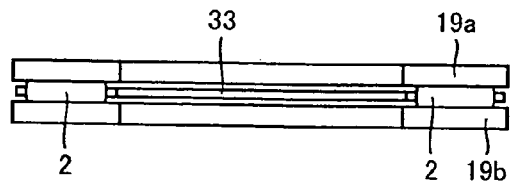
FIG. 1 shows a thrust roller bearing in Embodiment 1 of the present invention.

FIG. 1 shows a thrust roller bearing in Embodiment 1 of the present invention. The thrust roller bearing includes roller bearing rings 19a, 19b, a needle roller 2 arranged between these roller bearing rings, and a cage 33 guiding and holding needle roller 2. Cage 33 is provided with a pocket (not shown), and a roller holding portion (not shown) is provided on a periphery of a window of the pocket. A length in a radial direction of the roller holding portion in the present embodiment is within a range of 30% to 80% of the length in a radial direction of the pocket. Consequently, while attaining a function to hold the needle roller, oil passage performance to the inside of the bearing is improved, and life of the bearing can be extended.

(Embodiment 2)

Figure 2A:
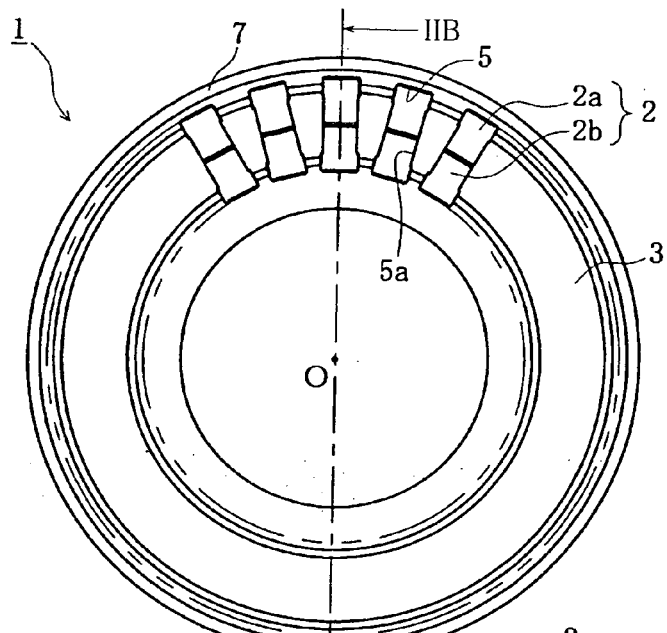
FIG. 2A is a plan view showing Embodiment 1 of the thrust roller bearing according to the present invention.
Figure 2B:
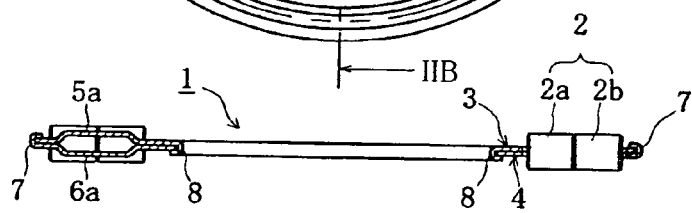
FIG. 2B is a cross-sectional view along the line IIB—IIB in FIG. 2A.
Figure 2C:
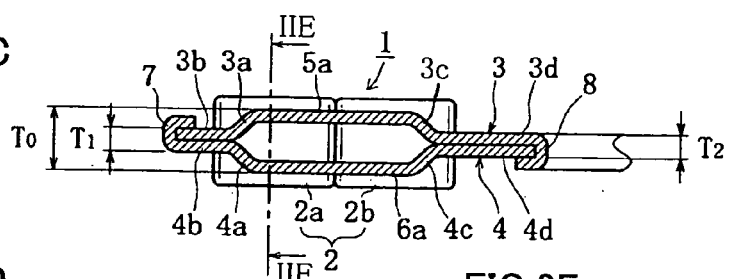
FIG. 2C is an enlarged view of a main portion of FIG. 2B.
Figure 2D:
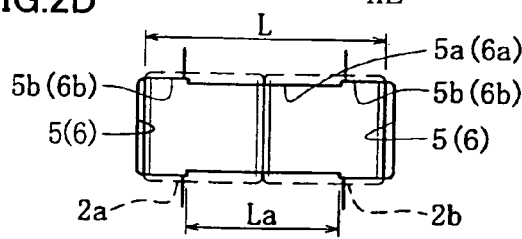
FIG. 2D is an enlarged view of a main portion of a pocket portion of FIG. 2A.
Figure 2E:
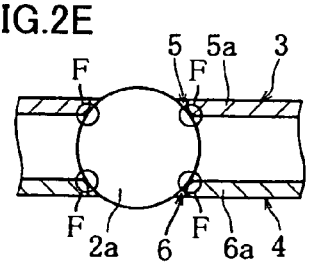
FIG. 2E is an enlarged cross-sectional view along the line IIE—IIE in FIG. 2C.

FIG. 2A is a plan view showing Embodiment 2 of a thrust roller bearing according to the present invention. FIG. 2B is a cross-sectional view along the line IIB—IIB in FIG. 2A. FIG. 2C is an enlarged view of a main portion of FIG. 2B. FIG. 2D is an enlarged view of a main portion of another portion of FIG. 2A. FIG. 2E is an enlarged cross-sectional view along the line IIE—IIE in FIG. 2C.

A thrust roller bearing 1 is constituted of a plurality of needle rollers 2 and two annular cages 3, 4 holding needle rollers 2 in a circumferential direction in a prescribed pitch. Here, two cages 3, 4 have a plurality of pockets 5, 6 in a rectangular shape having a length larger than length L of needle roller 2 in a radial direction respectively. Here, two cages 3, 4 are formed from a steel plate made of cold-rolled steel (SPCC) by press working. On opposing edges of each pocket 5, 6, roller holding portions 5a, 6a projecting so as to face each other are formed. Roller holding portions 5a, 6a hold needle roller 2 by sandwiching the same from above and below. The most significant feature in the present embodiment is that length La of the roller holding portion is within a range of 30% to 80% of the pocket length. With this structure, while attaining a function to hold the needle roller, oil passage performance to the inside of the bearing is improved, and life of the bearing can be extended. From the viewpoint of ensured holding of the needle roller, it is more preferable for the roller holding portion to have a length not smaller than 40% of the length in the radial direction of the pocket. From the viewpoint of improvement in the oil passage performance, it is more preferable for the roller holding portion to have a length not larger than 70% of the length in the radial direction of the pocket. Here, cages 3, 4 may be drawn and formed from band steel such as SCM 415 by pressing.

Needle roller 2 is formed by a needle roller 2a on the outer diameter side and a needle roller 2b on the inner diameter side, which are arranged in pockets 5, 6 in multiple rows. By implementing rollers in two rows, in each needle roller 2a, 2b, a difference in the peripheral speed of revolution between the outer diameter side portion and the inner diameter side portion is made smaller, thereby suppressing slipping with respect to the raceway surface (not shown). Thus, heating at a contact portion is reduced, and surface damage (smearing) can be prevented. As described above, the length in the radial direction of the roller holding portion is set to 30% to 80% of the length in the radial direction of the pocket. In this manner, while reliably holding the needle roller, oil passage performance can be improved. In other words, the lubricating oil can attain easy passage by virtue of concave portions 5b, 6b formed on an inner end side and an outer end side in the radial direction of roller holding portions 5a, 6a. Though needle roller 2 implemented by rollers 2a, 2b in multiple rows has been shown by way of example, the single-row needle roller may be employed. In addition, the end face of needle roller 2 may be in an arc face not limited to a flat shape.

In two cages 3, 4, a radially outer portion of roller holding portion 5a of upper cage 3 is constituted of an inclined extension 3a bent from an outer end of roller holding portion 5a and an outer plate portion 3b bent so as to have a bend line intersecting the radial direction from the lower end of inclined extension 3a, as shown in FIG. 2C. A radially inner portion of roller holding portion 5a of upper cage 3 is constituted of an inclined extension 3c similarly bent from an inner end of roller holding portion 5a and an inner plate portion 3d bent so as to have a bend line intersecting the radial direction from the lower end of inclined extension 3c.

A radially outer portion of roller holding portion 6a of lower cage 4 obtained by dying out with the same die as that for upper cage 3 is constituted of an inclined extension 4a bent from an outer end of roller holding portion 6a and an outer plate portion 4b bent so as to have a bend line intersecting the radial direction from the lower end of inclined extension 4a. A radially inner portion of roller holding portion 6a of lower cage 4 is constituted of an inclined extension 4c similarly bent from an inner end of roller holding portion 6a and an inner plate portion 4d bent so as to have a bend line intersecting the radial direction from the lower end of inclined extension 4c. Then, in two cages 3, 4, outer plate portions 3b, 4b are superposed and the outermost portion of outer plate portion 4b is bent upward, so as to form a caulked portion 7. In addition, inner plate portions 3d, 4d are also superposed and the innermost portion of inner plate portion 3d is bent downward, so as to form a caulked portion 8. With these caulked portions 7, 8 caulking and fixing the inner end portions, two cages 3, 4 are firmly integrated, whereby two cages 3, 4 are not separated even during operation. Moreover, in outer plate portions 3b, 4b and inner plate portions 3d, 4d, larger contact area of the end face of needle roller 2 with pockets 5, 6 can be ensured, and drilling abrasion can be suppressed.

In a state in which two cages 3, 4 are fixed, in roller holding portions 5a, 6a formed by two cages 3, 4, thickness T1, T2 in an up-down direction of the radially outer portion and the radially inner portion is smaller than thickness T0 in an up-down direction of roller holding portions 5a, 6a, because inclined extensions 3a, 4a and 3c, 4c are present.

Figure 3:
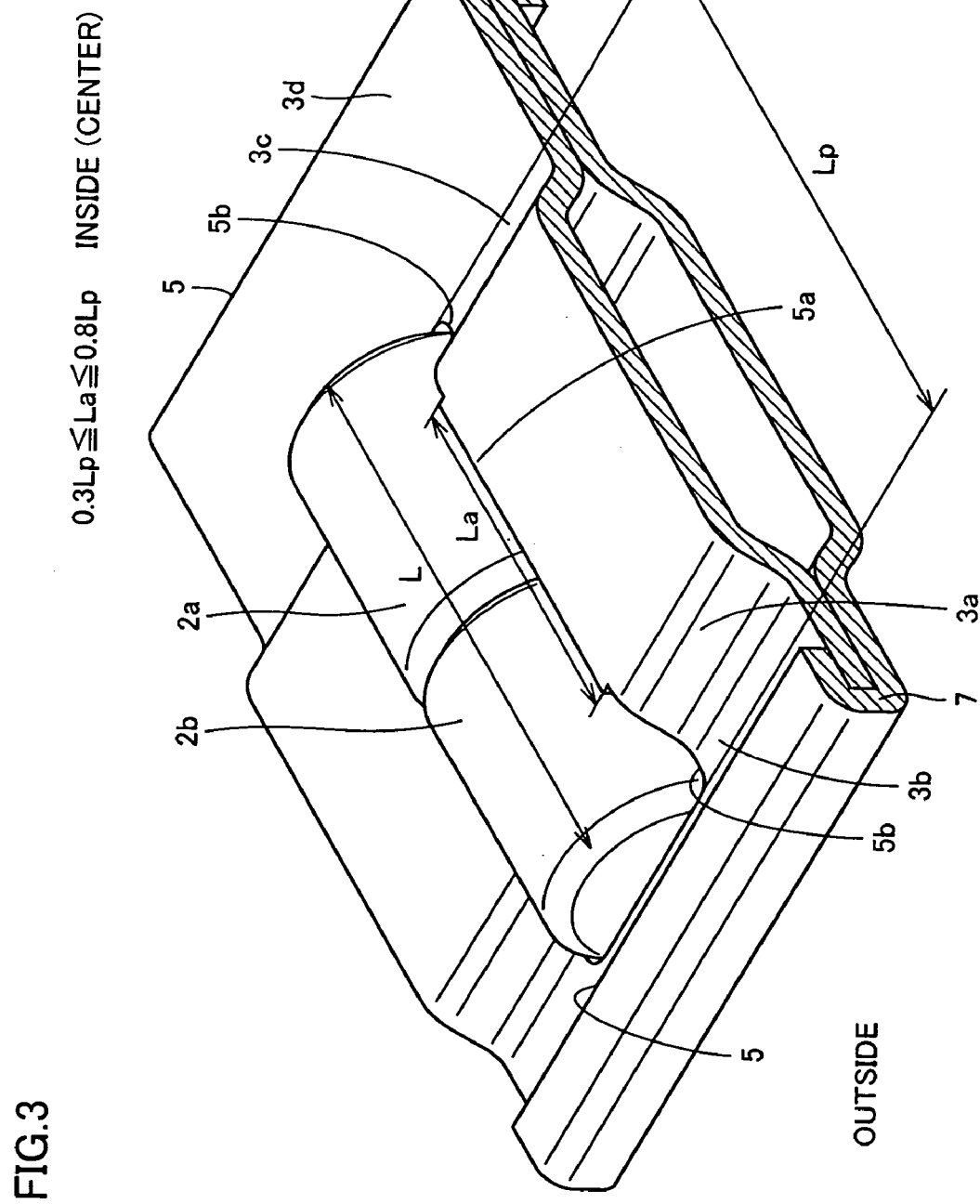
FIG. 3 is a partial perspective view of the thrust roller bearing in FIG. 2A.
Figure 4A:
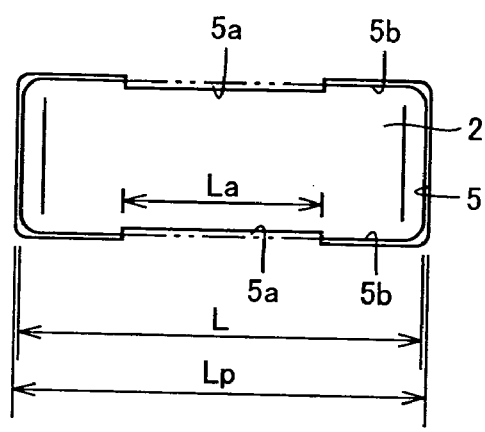
FIG. 4A shows an example of a single roller holding portion in a single row roller.
Figure 4C:
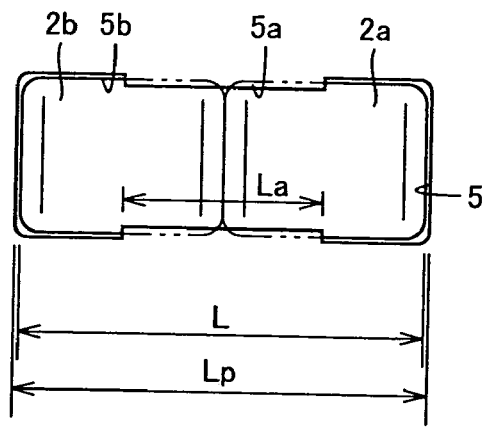
FIG. 4C shows an example in which a single roller holding portion is provided in multiple roller rows.
Figure 4B:
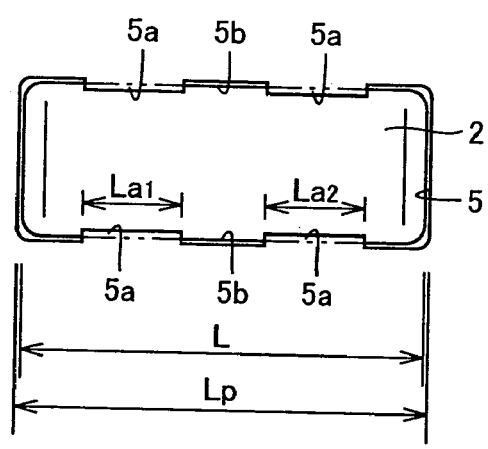
FIG. 4B shows an example of a plurality of roller holding portions in a single row roller.
Figure 4D:
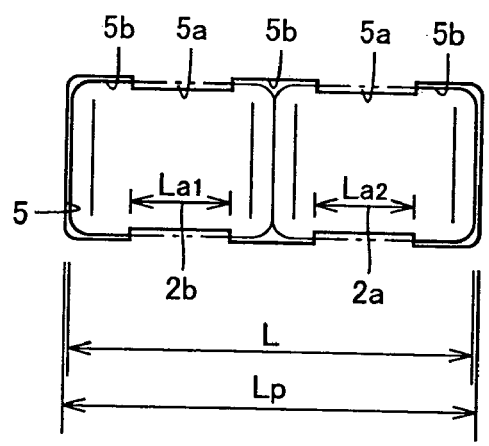
FIG. 4D shows an example in which a plurality of roller holding portions are provided in multiple roller rows.

FIG. 3 is a perspective view showing a state in which the needle roller is rotatably bound by the roller holding portion in the cage described above. Roller holding portion 5a is positioned above the axis of the needle roller, and projects toward the needle roller.

FIG. 4 shows a roller row and a roller holding portion as well as a variation thereof in Embodiment 2 of the present invention. FIG. 4A shows a single roller holding portion in a single row roller. Length Lp in the radial direction of the pocket is slightly larger than roller length L. In addition, length La of roller holding portion 5a satisfies a relation with respect to length Lp in the radial direction of the pocket of $0.3Lp \leq La \leq 0.8Lp$. FIG. 4B shows a plurality of roller holding portions in a single row roller. Assuming that the length in the radial direction of each of the plurality of roller holding portions is denoted as Lai, and that $La=La1+La2+\ldots+Lai+\ldots$, a relation of $0.3Lp \leq La \leq 0.8Lp$ as shown in the inequality above is established between La and Lp. FIG. 4C shows an example in which a single roller holding portion is provided in multiple-row roller. FIG. 4D shows an example in which a plurality of roller holding portions are provided in multiple-row roller. In all cases, in order to ensure holding of the needle roller and to improve oil passage performance of the lubricating oil, La is set to be within a range of $(0.3 \text{ to } 0.8) \times Lp$.

Though the roller holding portions shown in FIGS. 4A to 4D are all symmetric, asymmetric roller holding portions may be employed.

Figure 5:
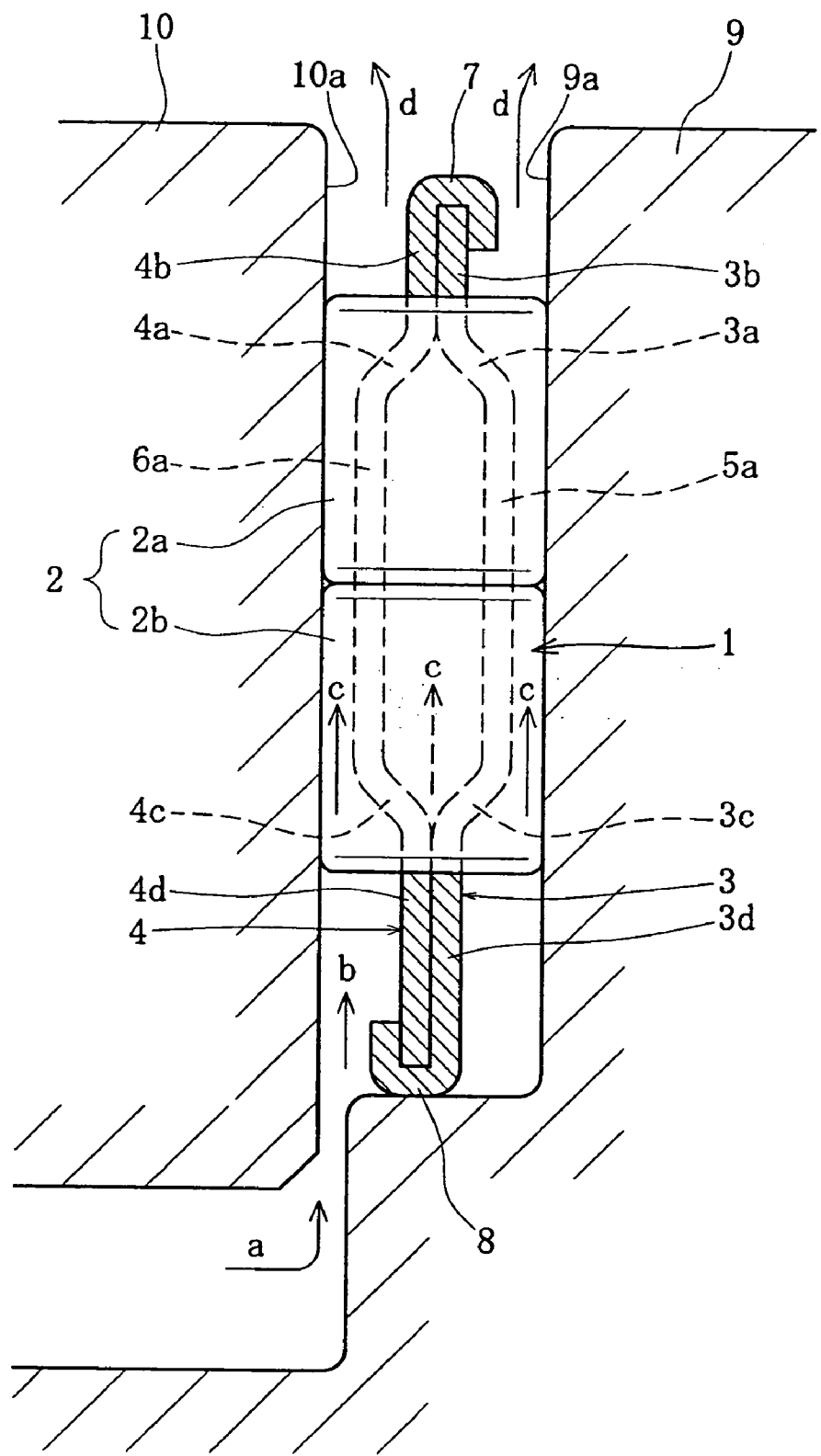
FIG. 5 is a partial cross-sectional view illustrating a state of use of the thrust roller bearing in Embodiment 2 of the present invention.

The oil passage performance of the lubricating oil will now be described. As shown in FIG. 5, thrust roller bearing 1 having the above-described structure attains clearance fit using caulked portion 8 of upper cage 3 as a guiding face so that needle roller 2 rolls between a raceway surface 9a of a first axis 9 (rotation axis) and a raceway surface 10*a* of a second axis (fixed axis) 10. When first axis 9 rotates, the roller rotates with first axis 9, and needle roller 2 rolls between first axis 9*a* and raceway surface 10*a* of second axis 10. Here, the lubricating oil is supplied from a not-shown hydraulic pressure source via an oil path to thrust roller bearing 1.

The lubricating oil passes the oil path as shown with an arrow a, and passes between raceway surface 10*a* of second axis 10 and a radially inner portion with respect to roller holding portion 6*a* of lower cage 4 as shown with an arrow b. Thereafter, the lubricating oil passes through a space around needle 2 and a space formed by cages 3, 4 as shown with an arrow c, and then lubricates between a side surface of needle roller 2 and roller holding portions 5*a*, 6*a* of cages 3, 4, between end faces of needle roller 2, as well as between the side surface of needle roller 2 and raceway surfaces 9*a*, 10*a*. Further, the lubricating oil passes between raceway surface 10*a* of second axis 10 and a radially outer portion with respect to roller holding portion 6*a* of cage 4 and between raceway surface 9*a* of first axis 9 and a radially outer portion with respect to roller holding portion 5*a* of cage 3, and finally exits as shown with an arrow d.

In lubrication of each portion by the lubricating oil, in roller holding portions 5*a*, 6*a* formed by two cages 3, 4, thickness T1, T2 of the radially outer portion and the radially inner portion is made smaller than thickness T0 of roller holding portions 5*a*, 6*a* (see FIG. 2C). In addition, length La in the radial direction of the roller holding portion is set to be within a range of 0.3 to 0.8 of length Lp in the radial direction of the pocket (see FIG. 2D). Therefore, a cross-section of a space between raceway surface 10*a* of second axis 10 and the radially inner portion with respect to roller holding portion 6*a* of lower cage 4 is made larger than in the conventional example, and not only flow-out performance but also flow-in performance of the lubricating oil is improved. Therefore, it is ensured that burn in each portion of the bearing can be prevented, and drilling abrasion of the end face of needle roller 2 and pockets 5, 6 of cages 3, 4 can be suppressed. In addition, as the passage of the lubricating oil is unlikely to be blocked by cages 3, 4, the lubricating oil does not tend to stay, thereby suppressing an increase in the oil temperature. Accordingly, durability of the bearing can further be improved in addition to enhancement in the strength of the cage.

A procedure for manufacturing thrust roller bearing 1 according to the present invention will now be described in detail. Two cages are worked by punching a window after forming, so that the roller holding portion has a length La attaining 30% to 80% of length Lp in the radial direction of the pocket. The steps of forming and punching the window may be performed in a single closed die forging step. The step of opening the window may be performed by electric discharge machining, wire cut working, or cutting.

Two cages 3, 4 and needle roller 2 that has been or has not been subjected to quenching and tempering are set, and the outermost portion of outer plate portion 4*b* is bent upward, so as to form caulked portion 7. The innermost portion of inner plate portion 3*d* is bent downward to form caulked portion 8. Two cages 3, 4 are thus integrally fixed. Here, an SUJ bearing steel, which is category 1 or 2 of high carbon chromium bearing steel, for example, is used as a material of needle roller 2. As a quenching and tempering treatment that should be completed with respect to the needle roller described above, for example, oil-hardening at 840° C.×30 minutes and subsequent tempering at 180° C.×90 minutes are performed, so that the surface hardness is set approximately to Vickers hardness (Hv) of 700 to 750.

Thereafter, carburization, quenching and tempering, or quenching and tempering after carbo-nitriding treatment is performed in a state in which needle roller 2 and two cages 3, 4 are set, so as to complete a product. In this case, conditions for carburizing treatment are as follows: carburization at 850° C.×35 minutes (in an atmosphere of the RX gas); quenching in an oil or a cooling gas; and subsequent tempering at 165° C.×60 minutes. On the other hand, conditions for the carbo-nitriding treatment are as follows: holding in an atmosphere for carbo-nitriding (adding 1 to 3 volume % of ammonia to the RX gas) at 840 to 850° C.×35 minutes for carbo-nitriding; and immediately thereafter, rapidly cooling in the oil or the cooling gas.

Here, two cages 3, 4 may be subjected to nitrocarburizing treatment in advance at 570 to 580° C.×35 minutes for improving strength. Needle roller 2 does not need to be subjected to heat treatment in advance. If heat treatment, that is, through hardening is performed in advance before incorporation, it is advantageous in that further improvement in strength can be achieved by carburization or the carbo-nitriding treatment which will be performed later, though a process step in manufacturing is increased. The process for manufacturing is at least simplified as compared with the conventional method in which two cages 3, 4 and needle roller 2 are separately subjected to heat treatment, and the caulked portion is annealed. If cages 3, 4 are nitrocarburized, it is possible to subject cages 3, 4 and needle roller 2 separately to heat treatment and to set the same, followed by caulking cages 3, 4.

By manufacturing thrust roller bearing 1 with the procedure describe above, specific properties described below can be obtained. Such properties will now be described in detail.

First, in needle roller 2, a carburized case or a carbo-nitrided case is formed on its surface portion. Therefore, hardness of the surface is higher than in the conventional product. Even if bite of a foreign matter of high hardness takes place, an impression is unlikely to be produced, thereby contributing to long life. In the carbo-nitriding treatment, a nitrogen enriched layer is formed, and a residual amount of austenite therein is over 20 volume %. Conventionally, if bite of a foreign matter of high hardness occurs in raceway surfaces 9*a*, 10*a*, stress concentration has been observed around the impression. Such stress concentration, however, is mitigated by plastic deformation of the residual austenite which is present in a large amount, thereby contributing to further hardening and long life. Here, specifically, the nitrogen enriched layer can be made to a thickness of not smaller than 0.1 mm and to a surface hardness of not smaller than 750 Hv. In addition, the inside hardness can be made as high as the surface hardness, thereby improving the strength of entire needle roller 2. Therefore, even under a harsh condition, for example, in a use under high load, needle roller 2 can bear such load sufficiently and satisfy a desired life.

In cages 3, 4, similarly to needle roller 2, a carburized case or a carbo-nitrided case is formed in its surface, and the surface hardness can be made to at least 400 Hv, or at least to 600 Hv depending on a condition of heat treatment. Therefore, resistance to abrasion can be improved as compared with a conventional product.

(Embodiment 3)

Figure 6A:
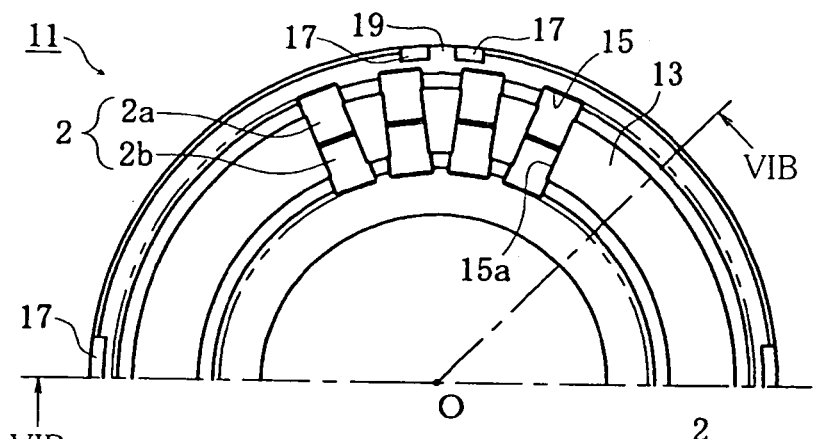
FIG. 6A is a plan view showing a thrust roller bearing in Embodiment 3 of the present invention.
Figure 6B:
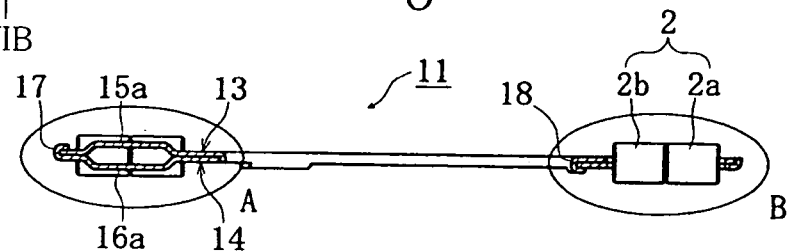
FIG. 6B is a cross-sectional view along the line VIB-O-VIB in FIG. 6A.
Figure 6C:
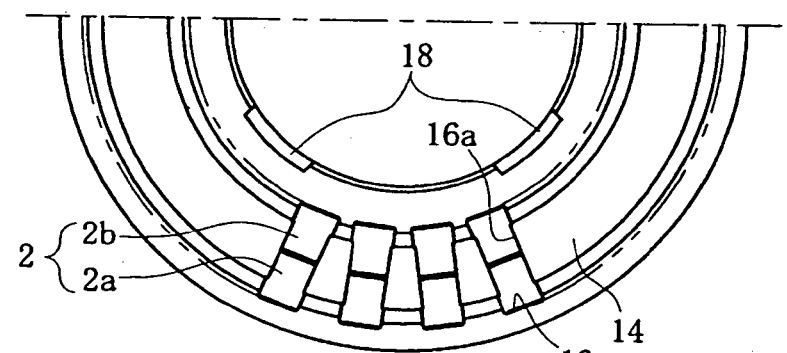
FIG. 6C is a bottom view of FIG. 6A.
Figure 6D:
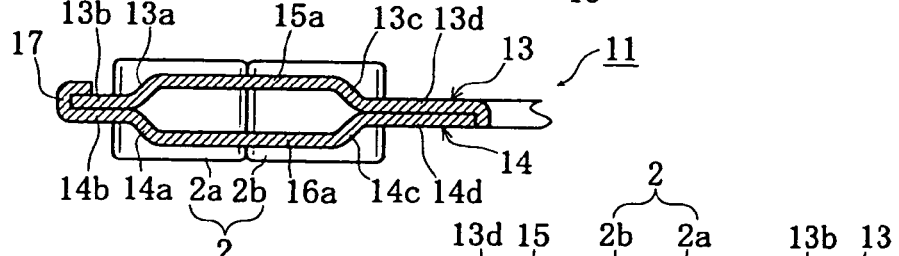
FIG. 6D is an enlarged view of portion A in FIG. 6B.
Figure 6E:
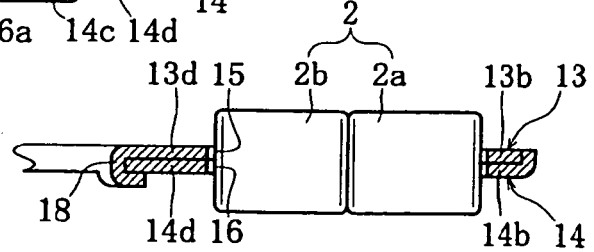
FIG. 6E is an enlarged view of portion B in FIG. 6B.

FIG. 6A is a plan view showing Embodiment 3 of a thrust roller bearing according to the present invention. FIG. 6B is a cross-sectional view along the line VIB-O-VIB in FIG. 6A. FIG. 6C is a bottom view of FIG. 6A. FIG. 6D is an enlarged view of portion A in FIG. 6B. FIG. 6E is an enlarged view of portion B in FIG. 6B. Embodiment 3 is different from above-described Embodiment 2 only in a shape of the cage and the method of caulking. The same or corresponding components are given the same reference characters, and detailed description thereof will not be provided.

A thrust roller bearing 11 is constituted of a plurality of needle rollers 2, and two annular cages 13, 14 holding needle rollers 2 in a circumferential direction in a prescribed pitch. In two cages 13, 14, a radially outer portion of a roller holding portion 15a of upper cage 13 is constituted of an inclined extension 13a bent from an outer end of roller holding portion 15a and an outer plate portion 13b bent toward the radial direction from the lower end of inclined extension 13a, as shown in FIG. 6D.

A radially inner portion of roller holding portion 15a of upper cage 13 is constituted of an inclined extension 13c similarly bent from an inner end of roller holding portion 15a and an inner plate portion 13d bent toward the radial direction from the lower end of inclined extension 13c.

A radially outer portion of a roller holding portion 16a of lower cage 14 obtained by dying out with the same die as that for upper cage 13 is constituted of an inclined extension 14a bent from an outer end of roller holding portion 16a and an outer plate portion 14b bent toward the radial direction from the lower end of inclined extension 14a. A radially inner portion of roller holding portion 16a of upper cage 14 is constituted of an inclined extension 14c similarly bent from an inner end of roller holding portion 16a and an inner plate portion 14d bent toward the radial direction from the lower end of inclined extension 14c.

Then, in two cages 3, 4, as shown in FIG. 6D, outer plate portions 13b, 14b are superposed and a part of the outermost portion of outer plate portion 14b is bent upward, so as to form a partial caulked portion 17. On the other hand, inner plate portions 13d, 14d are superposed and the innermost portion of inner plate portion 13d is bent downward. In addition, as shown in FIG. 6E, outer plate portions 13b, 14b are superposed and the outermost portion of outer plate portion 14b is bent upward. Moreover, inner plate portions 13d, 14d are superposed and a part of the outermost portion of inner plate portion 13d is bent downward, so as to form a partial caulked portion 18. With these partial caulked portions 17, 18, two cages 13, 14 are firmly integrated in their inner end and outer end portions. Compared to entire circumferential caulking in Embodiment 2 described previously, a process for caulking can considerably be simplified.

A portion 19 on an outer circumference of the cage serves as a positioning portion for bringing two cages 13, 14 in phase. For example, a notch (not shown) is formed on an outer circumference of upper cage 13, to which a protrusion (not shown) formed on an outer circumference of lower cage 14 is engaged, whereby pitch of pockets 15, 16 of both cages 13, 14 is not displaced during caulking or the like. Partial caulked portions 17, 18 are formed at four places on the circumference with their phases shifted by 45° from each other, so as to prevent an influence on deformation of the cage during caulking. Here, the partial caulked portion does not necessarily have to be formed at four places. If the partial caulked portions are evenly distributed at two or more places, they can prevent an influence on deformation of the cage during caulking. For example, they may be arranged in 5 to 8 places.

The most significant feature in the present embodiment is that length La of the roller holding portion is set to be within a range of 30% to 80% of the pocket length Lp. With this structure, while attaining a function to hold the needle roller, oil passage performance to the inside of the bearing is improved, and life of the bearing can be extended. From the viewpoint of ensured holding of the needle roller, it is more preferable for the roller holding portion to have a length not smaller than 40% of the length in the radial direction of the pocket. From the viewpoint of improvement in the oil passage performance, it is more preferable for the roller holding portion to have a length not larger than 70% of the length in the radial direction of the pocket. In the embodiments described later, it has been confirmed that holding of the needle roller and the oil passage performance are both satisfied if the length of the roller holding portion is within a range of 30% to 80% of the length in the radial direction of the pocket.

(Embodiment 4)

FIG. 7A is a plan view showing Embodiment 4 of a thrust roller bearing according to the present invention. FIG. 7B is a cross-sectional view along the line VIIB-O-VIIB in FIG. 7A. FIG. 7C is an enlarged view of portion C of FIG. 7B. FIG. 7D is an enlarged view of portion D in FIG. 7B. Embodiment 4 is different from above-described Embodiment 3 only in a direction of caulking. The same or corresponding components are given the same reference characters, and detailed description thereof will not be provided.

A thrust roller bearing 11' is constituted of a plurality of needle rollers 2, and two annular cages 13', 14' holding needle rollers 2 in a circumferential direction in a prescribed pitch. In two cages 13', 14', a radially outer portion of roller holding portion 15a of upper cage 13' is constituted of inclined extension 13a bent from an outer end of roller holding portion 15a and outer plate portion 13b bent so as to have a bend line intersecting the radial direction from the lower end of inclined extension 13a, as shown in FIG. 7C. A radially inner portion of roller holding portion 15a of upper cage 13 is constituted of inclined extension 13c similarly bent from an inner end of roller holding portion 15a and an inner plate portion 13d' bent toward the radial direction from the lower end of inclined extension 13c.

A radially outer portion of roller holding portion 16a of lower cage 14 is constituted of inclined extension 14a bent from an outer end of roller holding portion 16a and outer plate portion 14b bent toward the radial direction from the lower end of inclined extension 14a. A radially inner portion of roller holding portion 16a of upper cage 14 is constituted of inclined extension 14c similarly bent from an inner end of roller holding portion 16a and an inner plate portion 14d' bent toward the radial direction from the lower end of inclined extension 14c.

Then, in two cages 13', 14', as shown in FIG. 7C, outer plate portions 13b, 14b are superposed and a part of the outermost portion of outer plate portion 14b is bent upward, so as to form partial caulked portion 17. On the other hand, inner plate portions 13d', 14d' are superposed and the outermost portion of inner plate portion 14d' is bent upward. In addition, as shown in FIG. 7D, inner plate portions 13d', 14d' are superposed and a part of the innermost portion of inner plate portion 14d' is bent upward, so as to form a partial caulked portion 18'. With these partial caulked portions 17, 18', two cages 13', 14' are firmly integrated in their inner end and outer end portions. Unlike the partial caulked portion in Embodiment 2 described previously, partial caulked portions 17, 18' are located in an identical face. Therefore, a process for caulking can further be simplified.

The most significant feature in the present embodiment is that length La of the roller holding portion is within a range of 30% to 80% of the pocket length Lp. With this structure, while attaining a function to hold the needle roller, oil passage performance to the inside of the bearing is improved, and life of the bearing can be extended. From the viewpoint of ensured holding of the needle roller, it is more preferable for the roller holding portion to have a length not smaller than 40% of the length in the radial direction of the pocket. From the viewpoint of improvement in the oil passage performance, it is more preferable for the roller holding portion to have a length not larger than 70% of the length in the radial direction of the pocket.

(Embodiment 5)

Figure 8A:
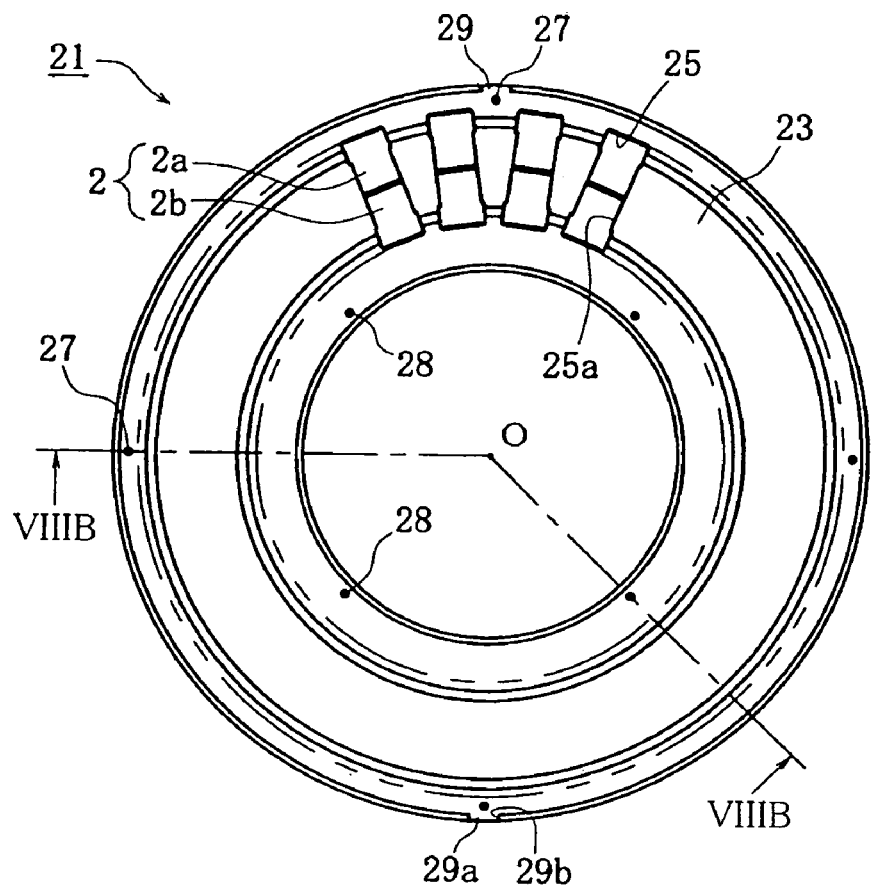
FIG. 8A is a plan view showing a thrust roller bearing in Embodiment 5 of the present invention.
Figure 8B:
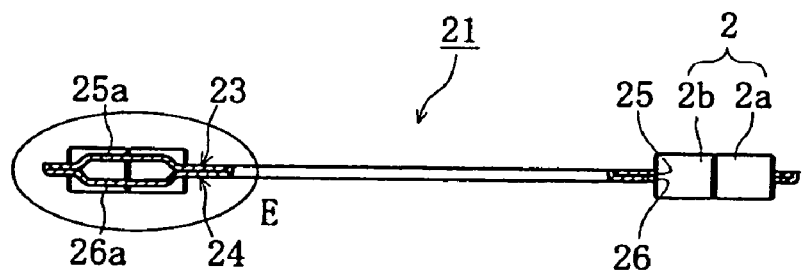
FIG. 8B is a cross-sectional view along the line VIIIB-O-VIIIB in FIG. 8A.
Figure 8C:
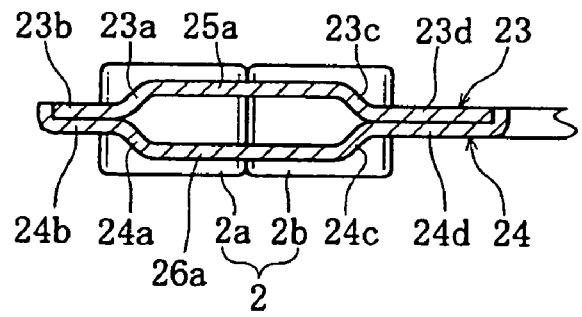
FIG. 8C is an enlarged view of portion E in FIG. 8B.

FIG. 8A is a plan view showing Embodiment 5 of a thrust roller bearing according to the present invention. FIG. 8B is a cross-sectional view along the line VIIIB-O-VIIIB in FIG. 8A. FIG. 8C is an enlarged view of portion E in FIG. 8B. Embodiment 5 is different from above-described Embodiments 2 to 4 only in means for fixing two cages. The same or corresponding components are given the same reference characters, and detailed description thereof will not be provided.

A thrust roller bearing 21 is constituted of a plurality of needle rollers 2, and two annular cages 23, 24 holding needle rollers 2 in a circumferential direction in a prescribed pitch. In two cages 23, 24, a radially outer portion of a roller holding portion 25a of upper cage 23 is constituted of an inclined extension 23a bent from an outer end of roller holding portion 25a and an outer plate portion bent so as to have a bend line intersecting the radial direction from the lower end of inclined extension 23a, as shown in FIG. 8C. In addition, a radially inner portion of roller holding portion 25a of upper cage 23 is constituted of an inclined extension 23c similarly bent from an inner end of roller holding portion 25a and an inner plate portion 23d bent so as to have a bend line intersecting the radial direction from the lower end of inclined extension 23c.

A radially outer portion of a roller holding portion 26a of lower cage 24 is constituted of an inclined extension 24a bent from an outer end of roller holding portion 26a and an outer plate portion 24b bent toward the radial direction from the lower end of inclined extension 24a. A radially inner portion of roller holding portion 26a of lower cage 24 is constituted of an inclined extension 24c similarly bent from an inner end of roller holding portion 26a and an inner plate portion 24d bent so as to have a bend line intersecting the radial direction from the lower end of inclined extension 24c.

Then, in two cages 23, 24, as shown in FIG. 8C, outer plate portions 23b, 24b are superposed and the outermost portion of outer plate portion 24b is bent upward. On the other hand, inner plate portions 23d, 24d are superposed and the innermost portion of inner plate portion 24d is bent upward. Here, the innermost portion of the inner plate portion 23d may be bent downward. In this embodiment, two cages 23, 24 are integrally fixed in the inner circumferential portion and the outer circumferential portion respectively with spot welding portions 27, 28, as shown in FIG. 8A. These welding portions 27, 28 are provided at four places in a circumferential direction at regular intervals with their phases shifted by 45° from each other, thereby preventing an influence on deformation of the cage by welding. Here, the partial caulked portions do not necessarily have to be formed at four places. If the partial caulked portions are evenly distributed at two or more places, influence on deformation of the cage during caulking can be prevented.

A portion 29 on an outer circumference of the cage serves as a positioning portion for bringing two cages 23, 24 in phase. A notch 29b formed on an outer circumference of lower cage 24 is engaged to a protrusion 29a formed on an outer circumference of upper cage 23, whereby pockets 25, 26 of two cages 23, 24 are not brought out of phase. Here, the structure of positioning portion 29 is not limited to such an example. For example, what is called a staking mechanism, in which a part of the outer circumference portion of lower cage 24 is caulked for engagement to upper cage 23 for fixation, or an engagement mechanism using a pin and a hole may be employed.

The most significant feature in the present embodiment is that length La of the roller holding portion is within a range of 30% to 80% of the pocket length Lp. With this structure, while attaining a function to hold the needle roller, oil passage performance to the inside of the bearing is improved, and life of the bearing can be extended. From the viewpoint of ensured holding of the needle roller, it is more preferable for the roller holding portion to have a length not smaller than 40% of the length in the radial direction of the pocket. From the viewpoint of improvement in the oil passage performance, it is more preferable for the roller holding portion to have a length not larger than 70% of the length in the radial direction of the pocket.

EXAMPLE

A single roller holding portion for multiple roller rows was provided in the thrust roller bearing shown in FIGS. 2A to 2E. This structure is similar not only to those in FIGS. 2A to 2E but also to that in FIG. 4C. A thrust roller bearing having a cage with such a structure was assembled. A variety of lengths La in the radial direction of the roller holding portion were set, so as to (A1) evaluate a tendency of falling of the roller from the pocket through a drop test with respect to three thrust roller bearings. In the drop test, a bearing to be tested was allowed to fall freely from a prescribed height (1.5 m) down to a concrete ground, so as to verify falling of the roller. In addition, (A2) the oil passage performance was evaluated through an oil passage performance test by varying the pocket length in a similar manner. In the oil passage performance test, the bearing was imposed with light load of approximately 100 N and rotated at 1000 to 3000 r/min; 500 ml of oil was supplied from the radially inner side; and a time period until the oil is completely drained from an outlet on the radially outer side was measured. In this oil passage performance test, a cage with multiple roller rows shown in FIG. 14B was used as a comparison example. Table 1 shows a result of the drop test, while Table 2 shows a result of the oil passage performance test.

TABLE 1

| Result of Drop Test | |
| --- | --- |
| Percentage of Length with respect to Pocket Longitudinal Portion | Result |
| 25% | Falling of the roller was observed in 2 out of n = 3. |
| 30% | Falling of the roller was observed in 0 out of n = 3. |

TABLE 2

Result of Oil Passage Test

| Percentage of Length with respect to Pocket Longitudinal Portion | Result |
| --- | --- |
| 75% | Amount of oil passage increased by 15%, as compared to an example in which percentage of length with respect to pocket longitudinal portion is set to 100%. |
| 80% | Amount of oil passage increased by 10%, as compared to an example in which percentage of length with respect to pocket longitudinal portion is set to 100%. |
| 85% | Amount of oil passage hardly changed, as compared to an example in which percentage of length with respect to pocket longitudinal portion is set to 100%. |

According to the result of the drop test shown in Table 1, when length La in the radial direction of the roller holding portion was set approximately to 25% of length Lp in the radial direction of the pocket, falling of the needle roller was observed in two out of three thrust roller bearings. In contrast, when La was set to 30% of Lp, falling of the needle roller was not observed in any of the three thrust roller bearings.

According to the result of oil passage performance test shown in Table 2, when length La in the radial direction of the roller holding portion was set to 85% of length Lp in the radial direction of the pocket, the amount of oil passage hardly changed as compared with the comparison example. In contrast, when length La in the radial direction of the roller holding portion was set to 80% of length Lp in the radial direction of the pocket, the amount of oil passage improved by 10% as compared with the comparison example. When the length of the roller holding portion described above was set to 75% of Lp, the amount of oil passage improved by 15% as compared with the comparison example.

According to such results, by setting length La in the radial direction of the roller holding portion to be within a range of 30% to 80% of length Lp in the radial direction of the pocket, the oil passage performance can be improved as compared with the conventional thrust roller bearing in which the roller holding portion was formed over an entire length of the pocket, without causing falling of the needle roller.

(Embodiment 6)

The thrust roller bearing in Embodiment 1 of the present invention has a shape similar to that of the thrust roller bearing shown in FIG. 1. On the other hand, in a cage in the present embodiment, a hardened case in a surface portion, in particular in an end face of a pocket, is formed to a depth larger than 3 μm and smaller than 100 μm. Therefore, abnormal abrasion such as drilling abrasion will be unlikely particularly in a peripheral portion of a window of the pocket where an outer circumferential side portion of the roller tends to contact. In addition, as the case depth is set to be within a prescribed range, an embrittled layer is thin. Accordingly, a crack is unlikely even in caulking an end portion on the outer or inner circumferential side of the cage. A crack is unlikely not only during such working but also during use. The hardened case described above can be obtained in a short period of time with the nitrocarburizing treatment, for example.

(Embodiment 7)

The thrust roller bearing in Embodiment 7 of the present invention has a shape similar to that of the thrust roller bearing shown in FIGS. 2A to 2E. On the other hand, the most significant feature in the present embodiment different from Embodiment 2 is that the hardened case is formed to a depth in a range larger than 3 μm and smaller than 100 μm in a surface portion of the cage, in particular in a peripheral portion of the window of the pocket. Therefore, abnormal abrasion does not occur in the peripheral portion of the window of the cage by the radially outer side end portion of the needle roller. In addition, as described later, a crack will not be produced even if caulking process in which superposition and bending is performed in the end portions on the radially outer side and the radially inner side of the cage is performed. Here, cages 3, 4 may be drawn and formed from band steel such as SCM 415 by pressing.

FIG. 3 shown above is a perspective view showing a state in which the needle roller is rotatably bound by the roller holding portion in the cage. Roller holding portion 5a is positioned above the axis of the needle roller, and projects toward the needle roller. Receiving the centrifugal force toward the outer circumferential side in the end portion of the outer circumference side of the cage, needle roller 2b is strongly pressed against the edge of the window of the pocket. Without any measure against it, drilling abrasion is caused in the periphery of the window. By forming a hardened case as described above, however, drilling abrasion can be suppressed.

The oil passage performance in the thrust roller bearing in the present embodiment is the same as in Embodiment 2.

Figure 9:
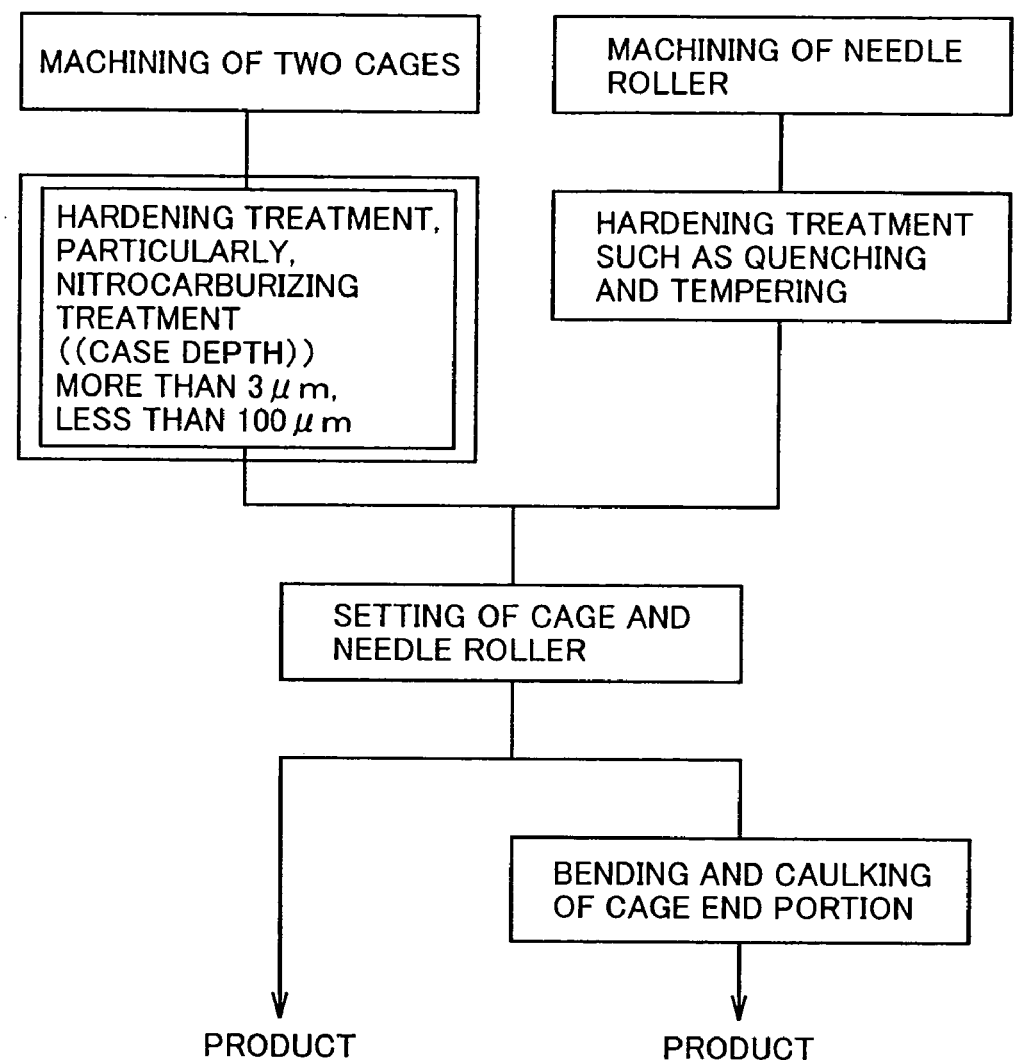
FIG. 9 shows a procedure of manufacturing a thrust roller bearing in Embodiment 6 of the present invention.

Referring to FIG. 9, a procedure for manufacturing a thrust roller bearing according to the present embodiment will be described in detail. A cage is formed by an upper member described above, that is, upper cage 3, and a lower member, that is, lower cage 4. First, a thin steel plate of a prescribed material is machined, and a pocket including an opening serving as a window is formed. "Machining" here includes antiplane extrusion press working for forming a pocket or punching for forming an opening as described above.

Thereafter, two cages 3, 4, that is, the upper member and the lower member, are subjected to the nitrocarburizing treatment at 570 to 580° C.×35 minutes for enhancing the strength. Other hardening treatment may be employed.

Meanwhile, the roller is subjected to a prescribed hardening treatment. Normally, it is subjected to quenching and tempering treatment. Alternatively, it may be subjected to the quenching treatment or the quenching and tempering treatment after the carbo-nitriding treatment. An SUJ bearing steel, which is category 1 or 2 of high carbon chromium bearing steel, for example, is used as a material of needle roller 2, which is subjected to oil-hardening at 840° C.×30 minutes and subsequent tempering at 180° C.×90 minutes, so that the surface hardness is set approximately to Vickers hardness (Hv) of 700 to 750. Needle roller 2 does not have to be subjected to heat treatment in advance. If heat treatment, that is, through hardening is performed in advance before incorporation, a process step in manufacturing is increased.

Thereafter, the roller is set so as to be accommodated in the pocket of the cage. Then, in at least one of the radially outer side end portion and the radially inner side end portion of the cage, the upper member and the lower member are superposed and bent, and subjected to caulking. The process for manufacturing is simplified as compared with the conventional method in which two cages 3, 4 and needle roller 2 are separately subjected to heat treatment, and the caulked portion is annealed.

When further hardness is aimed, the quenching treatment after carburizing treatment or the quenching and tempering treatment after carbo-nitriding treatment may be performed after caulking described above. As a carburized case or a carbo-nitrided case is formed in the surface portion of needle roller 2, hardness in the surface is higher than in the conventional product. Therefore, even if bite of a foreign matter of high hardness takes place, an impression is unlikely to be produced, thereby contributing to long life. In the carbo-nitriding treatment, a nitrogen enriched layer is formed, and a residual amount of austenite therein is over 20 volume %. Conventionally, if bite of a foreign matter of high hardness occurs in raceway surfaces 9a, 10a, stress concentration has been observed around the impression. Such stress concentration, however, is mitigated by plastic deformation of the residual austenite which is present in a large amount, thereby contributing to further hardening and long life. Here, specifically, the nitrogen enriched layer can be made to a thickness of not smaller than 0.1 mm and to a surface hardness of not smaller than 750 Hv. In addition, the inside hardness can be made as high as the surface hardness, thereby improving the strength of entire needle roller 2. Therefore, even under a harsh condition, for example, in a use under high load condition, needle roller 2 can bear such load sufficiently and satisfy a desired life.

In cages 3, 4, similarly to needle roller 2, a carburized case or a carbo-nitrided case is formed in the surface, and the surface hardness can be made to at least 400 Hv, or at least 600 Hv depending on a condition of heat treatment. Therefore, resistance to abrasion can be improved as compared with the conventional product.

(Embodiment 8)

The thrust roller bearing in Embodiment 3 of the present invention has a shape similar to that of the thrust roller bearing shown in FIGS. 6A to 6E in Embodiment 3 described above.

The most significant feature in the present embodiment different from the thrust roller bearing in Embodiment 3 is that the hardened case is formed to a depth in a range larger than 3 μm and smaller than 100 μm in a surface portion of the cage, in particular in a peripheral portion of the window of the pocket. Therefore, abnormal abrasion does not occur in the peripheral portion of the window of the cage by the radially outer side end portion of the needle roller. In addition, a crack will not be produced even if a caulking process in which superposition and bending is performed in the end portions on the radially outer side and the radially inner side of the cage is performed with the hardened case present. Here, cages 3, 4 may be drawn and formed from band steel such as SCM 415 other than SPCC by pressing.

(Embodiment 9)

The thrust roller bearing in Embodiment 9 of the present invention has a shape similar to that of the thrust roller bearing shown in FIGS. 7A to 7D in Embodiment 4 described above.

The most significant feature in the present embodiment different from the thrust roller bearing in Embodiment 4 is that the hardened case is formed to a depth in a range larger than 3 μm and smaller than 100 μm in a surface portion of the cage, in particular in a peripheral portion of a window of a pocket. Therefore, abnormal abrasion does not occur in the peripheral portion of the window of the cage by the radially outer side end portion of the needle roller. In addition, a crack will not be produced even if a caulking process in which superposition and bending is performed in the end portions on the radially outer side and the radially inner side of the cage is performed with the hardened case present. In order to further ensure prevention of abrasion and not to produce a crack during caulking, it is more preferable to set the depth of the hardened case to be within a range of 5 μm and 50 μm.

(Embodiment 10)

The thrust roller bearing in Embodiment 10 of the present invention has a shape similar to that of the thrust roller bearing shown in FIGS. 8A to 8C in Embodiment 4 described above.

The most significant feature in the present embodiment different from the thrust roller bearing in Embodiment 5 is that the hardened case is formed to a depth in a range larger than 3 μm and smaller than 100 μm in a surface portion of the cage, in particular in a peripheral portion of the window of the pocket. Therefore, abnormal abrasion does not occur in the peripheral portion of the window of the cage by the radially outer side end portion of the needle roller. In addition, a crack will not be produced even if a caulking process in which superposition and bending is performed in the end portions on the radially outer side and the radially inner side of the cage is performed with the hardened case present. In order to further ensure prevention of abrasion and not to produce a crack during caulking, it is more preferable to set the depth of the hardened case to be within a range of 5 μm and 50 μm.

EXAMPLE

Next, a thrust roller bearing is actually fabricated, and results of (1) measurement of abrasion in the radially outer side end face of the pocket of the cage (drilling abrasion) and (2) presence/absence of a crack during caulking will be described.

(1) Abrasion Test

With respect to the thrust roller bearing shown in FIGS. 2A to 2E, a test for resistance to drilling abrasion was conducted using a vertical high-temperature thrust tester. Conditions for the test is as follows.

(S1) revolutions per minute: 9000 r/min (S2) axial load: 4460N P/C=0.1

(S3) lubrication: circulating lubrication, turbine #46 oil (120 ml/min), room temperature (S4) operation time: 300 h As objects to be tested, two types of hardened cases in a cage having a depth of 3 μm and 5 μm respectively were fabricated by the nitrocarburizing treatment and tested. After the operation under the conditions described above, abrasion in the radially outer side end face portion of the pocket of the cage (drilling abrasion) was measured. Abrasion depth was obtained by measuring an abrasion shape on the surface from the end portion with a shape measurement apparatus (a contracer).

Figure 10A:
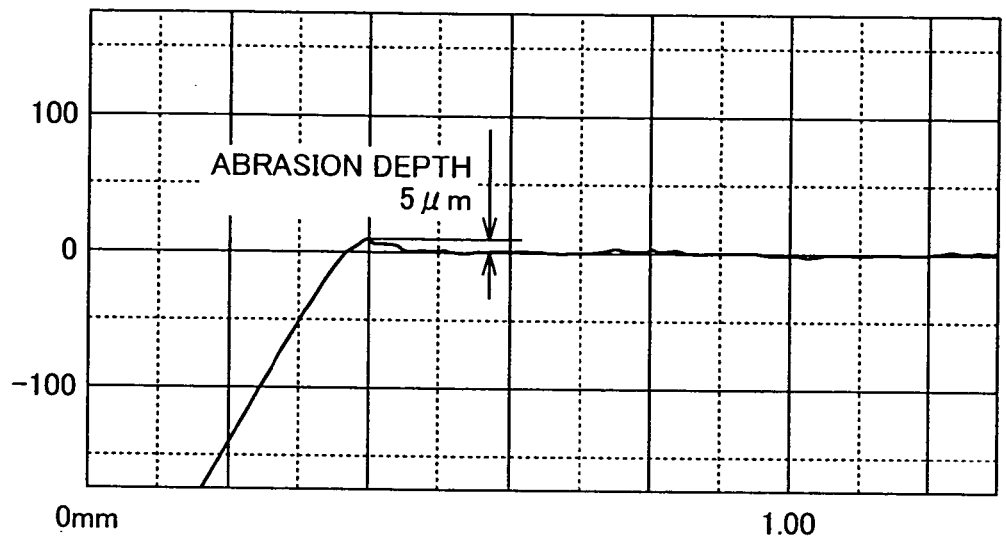
FIG. 10A shows a result of an abrasion test, that is, a profile of a surface portion using a contracer, and shows a result with regard to a test object when the case depth is set to 5 μm (an example of the present invention).
Figure 10B:
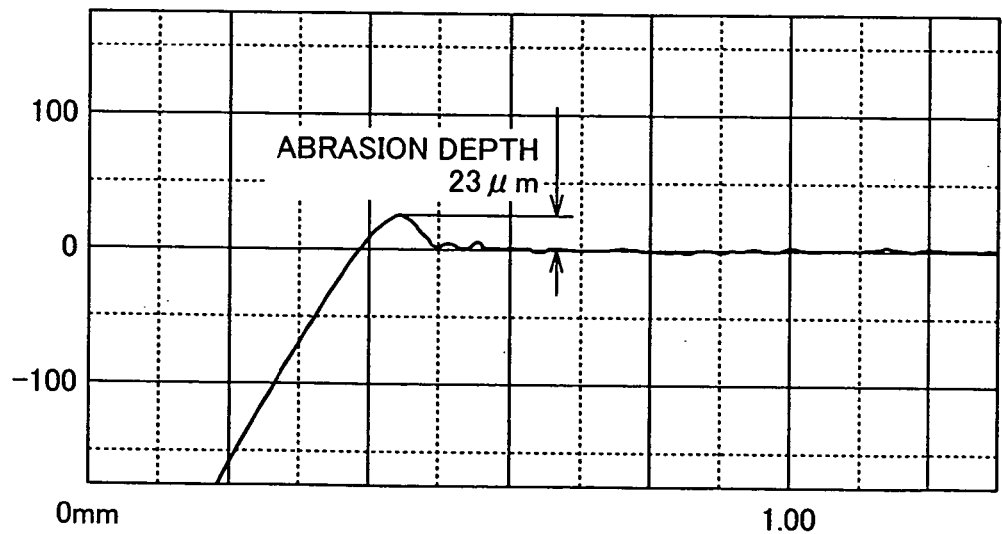
FIG. 10B shows a result of an abrasion test, that is, a profile of a surface portion using a contracer, and shows a result with regard to a test object when the case depth is set to 3 μm (a comparison example).

FIG. 10A shows a result of measurement with the contracer when the case depth was set to 5 μm (an example of the present invention), while FIG. 10B shows a result of measurement when the case depth was set to 3 μm (a comparison example). Referring to FIG. 10A, the abrasion depth indicating a drop from the end portion where abrasion was not caused was approximately 5 μm, which is within a tolerance. In contrast, the abrasion depth was as large as 23 μm when the case depth was set to 3 μm as shown in FIG. 10B. If such abnormally deep abrasion takes place, smooth rotation of the needle roller is hindered and durability is considerably deteriorated. Therefore, in order to ensure sufficient resistance to abrasion, the hardened case should be formed to a depth larger than 3 μm.

(2) Caulking Crack Test

Objects to be tested in which the case depth was varied through the nitrocarburizing treatment onto a thin steel plate material were prepared. Two types of objects to be tested having the case depth of 100 μm and 90 μm respectively were fabricated with the nitrocarburizing treatment. Then, two thin steel plates provided with the hardened case (nitrocarburized case) were superposed, bent, and subjected to caulking. Thereafter, presence/absence of a crack was examined. Here, an inner dend radius R in bending was set to 0.2.

Figure 11A:
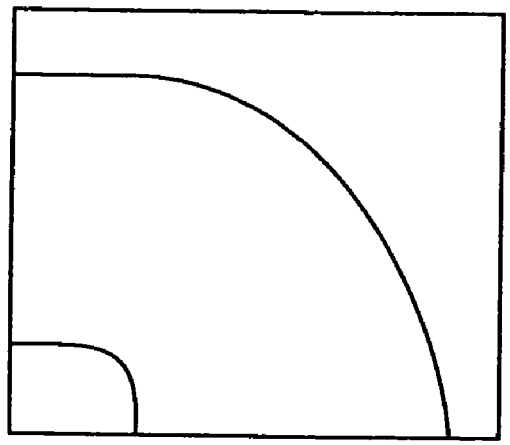
FIG. 11A shows a result of a caulked portion crack test, and shows a result with regard to an example in which the case depth is set to 90 μm (an example of the present invention).
Figure 11B:
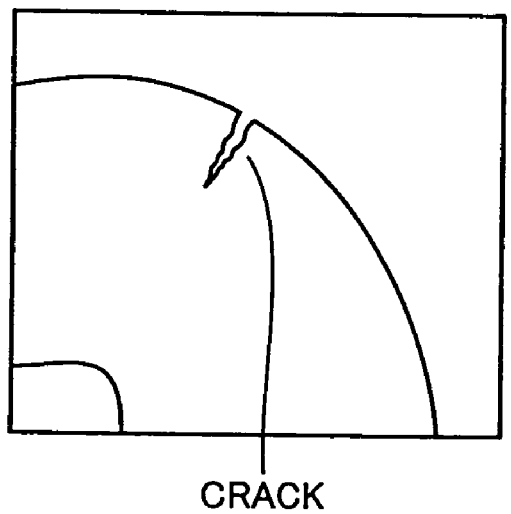
FIG. 11B shows a result of a caulked portion crack test, and shows a result with regard to an example in which the case depth is set to 100 μm (a comparison example).

FIGS. 11A and 11B show a result. Referring to these figures, a crack was not observed in the worked portion when the case depth was set to 90 μm. On the other hand, a crack was produced when the case depth was set to 100 μm, which indicates that deterioration in durability is inevitable.

According to the embodiment described above, by setting the case depth (nitrocarburized case) to larger than 3 μm and smaller than 100 μm, a thrust roller bearing satisfying both resistance to abrasion and resistance to caulking crack tendency can be provided.

(Embodiment 11)

The thrust roller bearing in Embodiment 11 of the present invention has a shape similar to that of the thrust roller bearing shown in FIGS. 2A to 2E in Embodiment 2 and FIG. 3 described above.

Needle roller 2 is constituted of needle roller 2a on the radially outer side and needle roller 2b on the radially inner side, and arranged in multiple rows in pockets 5, 6. In each needle roller 2a, 2b, a difference in a peripheral speed of revolution between the radially outer side portion and the radially inner side portion is made smaller, thereby suppressing slipping with respect to a raceway surface (not shown). Accordingly, heating at a contact portion is reduced, and surface damage or surface-originating separation can be prevented. Here, though multiple-row needle rollers 2a, 2b have the same length, depending on a condition of use, selection between the outer diameter shorter than the inner diameter and the outer diameter longer than the inner diameter can be made. For example, load-carrying capacity may be improved by setting the length of either longer one out of the outer diameter or the inner diameter to a length 1.2 times the shorter one.

Referring to FIG. 2D, length La in the radial direction of roller holding portions 5a, 6a is formed to be smaller than roller length L. In this manner, the lubricating oil can attain easy passage by virtue of concave portions 5b, 6b formed on both ends of roller holding portions 5a, 6a. Here, the end face of needle rollers 2a, 2b is not limited to a flat shape but may be formed by an arc face.

Referring to FIG. 2E, a corner portion of roller holding portions 5a, 6a is formed in a rolled-over manner when pockets 5, 6 are punched by pressing. Alternatively, the corner portion is smoothly rolled over by surface press working of an inner edge portion after punching. Needle rollers 2a, 2b can be guided and held in a stable manner without interrupting a lubricating oil film formed on the surface of needle rollers 2a, 2b.

Figure 12:
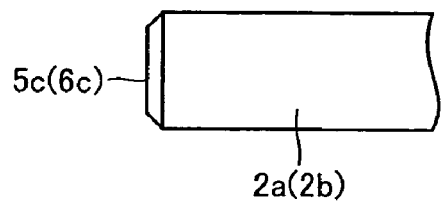
FIG. 12 illustrates an F end face (Japanese Industrial Standard).

The most noteworthy feature in the present embodiment is that end face 5c, 6c of each of needle rollers 2a, 2b is an F end face as shown in FIG. 12, and the end face accuracy is set to not larger than 30 μm. Here, the F end face refers to a shape according to F (flat) defined by JIS (Japanese Industrial Standards).

Figure 13A:
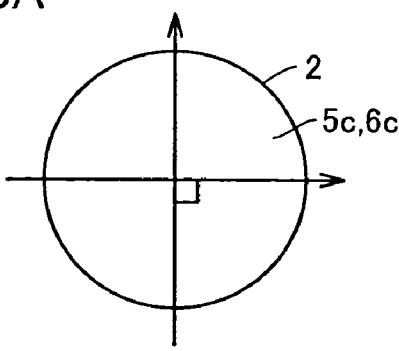
FIG. 13A is a schematic diagram showing a method of measuring the end face accuracy.
Figure 13B:
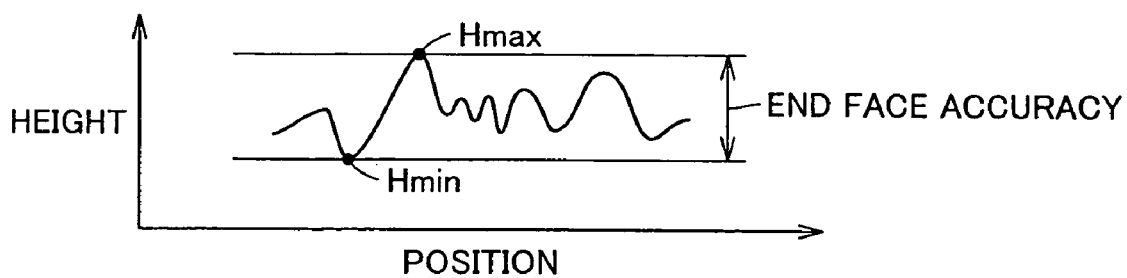
FIG. 13B shows a relation between a measurement result and the end face accuracy.

A method of measuring the end face accuracy will now be described. FIG. 13A is a schematic diagram showing a method of measuring the end face accuracy. Referring to FIG. 13A, first, variation in height in end faces 5c, 6c of needle roller 2 is measured. This measurement is performed along a direction of a diameter of end faces 5c, 6c respectively as shown with an arrow in the figure, and performed once for each end face so that measurement directions are at a right angle with respect to each other. A maximum value (Hmax) and a minimum value (Hmin) of the height in roller end faces 5c, 6c are extracted from variation in height measured in such a manner shown in FIG. 13B, and a difference between Hmax and Hmin indicates the end face accuracy. As an apparatus for measuring the end face accuracy, for example, Talysurf (manufactured by Taylor Hobson Ltd.) is used.

The inventors of the subject application presume that the problems of drilling abrasion and large bearing noise in the conventional thrust roller bearing are caused by the following factors. That is, the end face accuracy in each of needle rollers 2a, 2b used in thrust roller bearing 1 is so large as to increase resistance in a contact portion of needle roller 2a with adjacent needle roller 2b and cages 3, 4. Accordingly, friction when these elements collide with each other causes drilling abrasion, and the sound produced by friction when these elements collide with each other increases the bearing noise. Then, a relation between the end face accuracy of needle rollers 2a, 2b and the bearing noise in thrust roller bearing 1 was examined.

Figure 14:
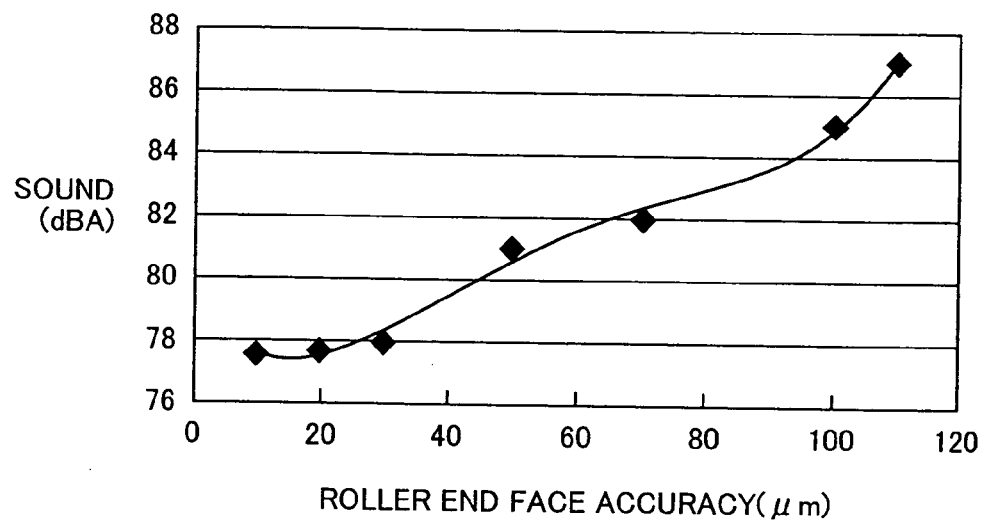
FIG. 14 shows a relation between the end face accuracy of a needle roller and the bearing noise.
Figure 15A:
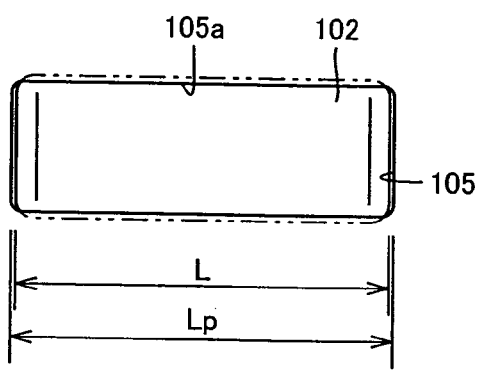
FIG. 15A shows a conventional cage in an example of a single-row roller.
Figure 15B:
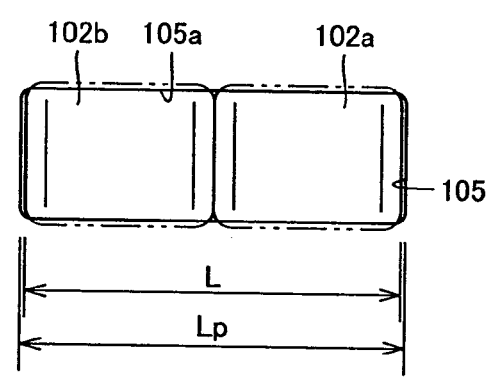
FIG. 15B shows a conventional cage in an example of a multiple-row roller.

FIG. 14 is a diagram (graph) showing a relation between the end face accuracy of needle rollers 2a, 2b and the bearing noise in the thrust roller bearing. Measurement of the noise was performed under the conditions in the following. Revolution speed of the thrust roller bearing was set to 1800 rpm; load was set to 100N; and a position of microphone was set distanced from the thrust roller bearing by 100 mm in a direction at an angle of 45 degrees with respect to the normal of the main surface of the cage.

Referring to FIG. 14, the bearing noise was larger than 81 dBA when the end face accuracy of the needle roller was equal to or larger than 50 μm, whereas it was significantly lowered to 78 dBA or smaller when the end face accuracy was equal to or smaller than 30 μm. This is because frictional resistance between the needle roller and the adjacent needle roller as well as frictional resistance between the needle roller and the cage were significantly reduced when the end face accuracy of the needle roller is equal to or smaller than 30 μm. Therefore, when the end face accuracy of the needle roller is equal to or smaller than 30 μm, frictional resistance is significantly lowered, and drilling abrasion will also be unlikely.

In thrust roller bearing 1 of the present embodiment, the end face accuracy of each of needle rollers 2a, 2b is set to not larger than 30 μm. Accordingly, frictional resistance between needle roller 2a and adjacent needle roller 2b as well as frictional resistance between needle rollers 2a, 2b and cages 3, 4 are made smaller. Consequently, drilling abrasion due to friction when these elements collide with each other is in particular unlikely, and the bearing noise produced by the sound when these elements collide with each other is in particular lowered.

A procedure for manufacturing thrust roller bearing 1 according to the present embodiment will now be described in detail. As one example, needle rollers 2a, 2b are formed by common outer diameter grinding, followed by secondary working on the end face by grinding or wire cut discharge machining. Here, wire cut discharge refers to a machining method of cutting a material using a conductive wire with a small diameter as an electrode. In this manner, the end face accuracy of needle rollers 2a, 2b is set to not larger than 30 μm.

Two cages 3, 4 and needle roller 2 that has been or has not been subjected to quenching and tempering are set, and the outermost portion of outer plate portion 4b is bent upward, so as to form caulked portion 7. The innermost portion of inner plate portion 3d is bent downward, to form caulked portion 8. Two cages 3, 4 are thus integrally fixed. Here, an SUJ bearing steel, which is category 1 or 2 of high carbon chromium bearing steel, for example, is used as a material of needle roller 2. Needle roller 2 is subjected to oil-hardening at 840° C.×30 minutes and subsequent tempering at 180° C.×90 minutes, so that the surface hardness is set approximately to Vickers hardness (Hv) of 700 to 750.

Thereafter, carburization, quenching and tempering, or the carbo-nitriding treatment is performed in a state in which needle roller 2 and two cages 3, 4 are set, so as to complete a product. In a case of carburizing treatment, needle roller 2 and two cages 3, 4 are subjected to carburization at 850° C.×35 minutes (in an atmosphere of the RX gas), quenching in an oil, and subsequent tempering at 165° C.×60 minutes. In a case of carbo-nitriding treatment, needle roller 2 and two cages 3, 4 are held in a carbo-nitriding atmosphere (adding 1 to 3 volume % of ammonia to the RX gas) at 840 to 850° C.×35 minutes for carbo-nitriding, and immediately thereafter, rapidly cooled in the oil.

Here, two cages 3, 4 may be subjected to nitrocarburizing treatment in advance at 570 to 580° C.×35 minutes for improving strength. Needle roller 2 does not need to be subjected to heat treatment in advance. If needle roller 2 is subjected to heat treatment, that is, through hardening in advance before incorporation, further improvement in strength thereof can be achieved by carburization or the carbo-nitriding treatment performed later, though a process step in manufacturing is increased. The process for manufacturing is simplified as compared with the conventional method in which at least two cages 3, 4 and needle roller 2 are separately subjected to heat treatment, and the caulked portion is annealed.

By manufacturing thrust roller bearing 1 with the procedure described above, specific properties described below can be provided. Such properties will now be described in detail.

First, in needle roller 2, a carburized case or a carbo-nitrided case is formed in its surface portion. Therefore, hardness of the surface is higher than in the conventional product. Even if bite of a foreign matter of high hardness takes place, an impression is unlikely to be produced, thereby contributing to long life. In the carbo-nitriding treatment, a nitrogen enriched layer is formed in needle roller 2, and a residual amount of austenite therein is over 20 volume %. Conventionally, if bite of a foreign matter of high hardness occurs in raceway surfaces 9a, 10a, stress concentration has been observed around the impression. Such stress concentration, however, is mitigated by plastic deformation of the residual austenite which is present in a large amount, whereby needle roller 2 attains high hardness and long life. Here, specifically, the nitrogen enriched layer can be made to a thickness of not smaller than 0.1 mm and to a surface hardness of not smaller than 750 Hv. In addition, the inside hardness can be made as high as the surface hardness, thereby improving the strength of entire needle roller 2. Therefore, needle roller 2 can be used even under a harsh condition, for example, in a use under high load condition, and can satisfy a desired life.

In cages 3, 4, similarly to needle roller 2, a carburized case or a carbo-nitrided case is formed in the surface, and the surface hardness can be made to at least 700 Hv. Therefore, resistance to abrasion is improved as compared with the conventional product.

(Embodiment 12)

The thrust roller bearing in Embodiment 12 of the present invention has a shape similar to that of the thrust roller bearing shown in FIGS. 6A to 6E in Embodiment 3 described above.

The most significant feature in the present embodiment is that the end faces of a plurality of rollers are F end faces, and the end face accuracy is set to not larger than 30 μm. With this end face, drilling abrasion can be suppressed and the bearing noise can be made smaller.

(Embodiment 13)

The thrust roller bearing in Embodiment 13 of the present invention has a shape similar to that of the thrust roller bearing shown in FIGS. 7A to 7D in Embodiment 4 described above.

In the thrust roller bearing in Embodiment 12 described above, the end faces of a plurality of rollers are F end faces, and the end face accuracy is set to not larger than 30 μm. With this end face, drilling abrasion can be suppressed and the bearing noise can be made smaller.

(Embodiment 14)

The thrust roller bearing in Embodiment 14 of the present invention has a shape similar to that of the thrust roller bearing shown in FIGS. 8A to 8C in Embodiment 5 described above.

In the present embodiment, an example in which a cage is in line contact with a roller with 4 roller holding portions has been shown. Meanwhile, an example, in which the roller holding portion is formed in a W shape (a cross-sectional shape of a portion other than a pocket of the cage along the radial direction is in a W shape) and a cage comes in line contact with the roller with 6 portions, may be possible, so long as the roller holding portion serves to hold the needle roller.

Figure 16A:
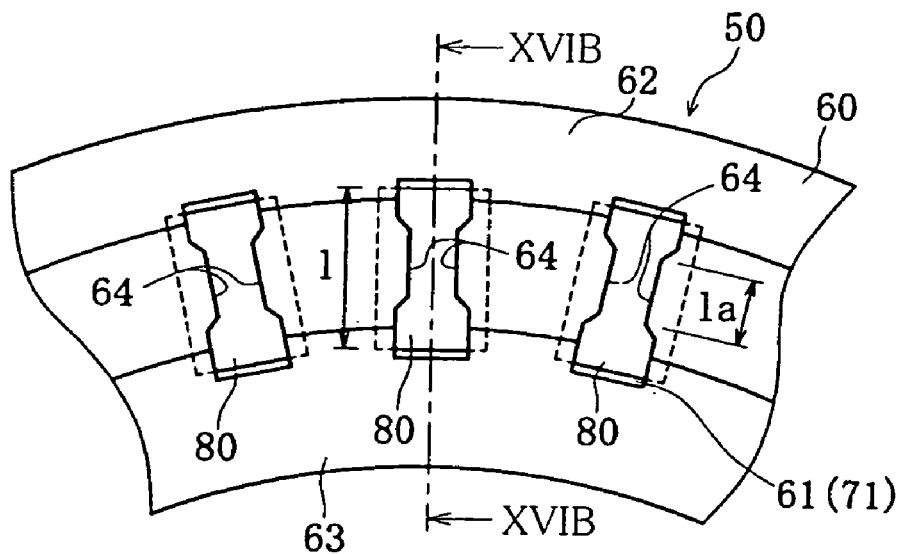
FIG. 16A is a partial plan view showing a conventional thrust roller bearing.
Figure 16B:
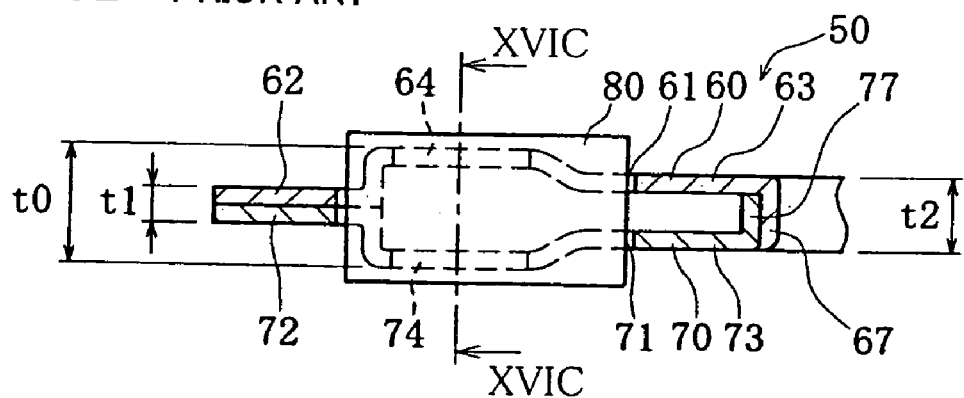
FIG. 16B is a cross-sectional view along the line XVIB—XVIB in FIG. 16A.
Figure 16C:
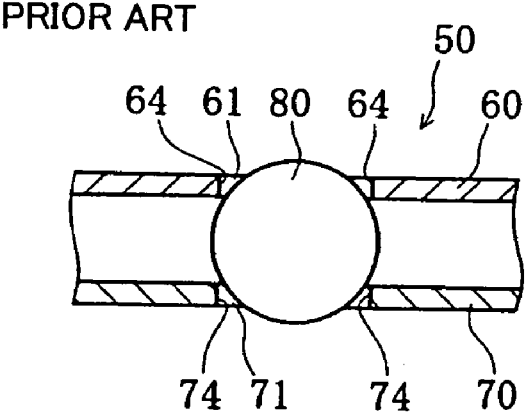
FIG. 16C is a cross-sectional view along the line XVIC—XVIC in FIG. 16B.

In addition, though a thrust roller bearing using a needle roller has been shown in the present embodiment, the present invention is applicable to a thrust roller bearing using a long cylindrical roller or a cylindrical roller. Though the present embodiment has shown an example in which the rollers are arranged in multiple rows, an example in which the rollers are arranged in a single row as shown in FIG. 16A can achieve an effect similar to that in embodiments described above, so long as the end face of each of the plurality of rollers is an F end face and the end face accuracy is not larger than 30 μm. Though grinding or wire cut discharge machining has been shown as an example of a method of secondary working of the end face of the roller, any working method which can attain the end face accuracy of not larger than 30 μm may be employed.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A thrust roller bearing, comprising:
   a plurality of needle rollers; and
   a cage for holding each said needle roller in a respective pocket for accommodating said needle roller, the cage having an upper member and a lower member for sandwiching said needle roller between them;

wherein the upper member and the lower member are subjected to caulking and are fixed to each other at a radially inner end portion and a radially outer end portion of each of them;

wherein a roller holding portion provided in said pocket has a length less than a length of said needle roller, and within a range of 30% to 80% of a length in a radial direction of said pocket;

wherein a flat portion having a height less than that of the roller holding portion, measured in a cross-section perpendicular to a plane along which the cage extends, is provided between the radially inner and outer end portions of the cage and an end portion of said needle roller; and wherein said pocket extends to the flat portion.

2. The thrust roller bearing according to claim 1, wherein said roller holding portion is constituted of a plurality of roller holding portions, and
a total length of the plurality of roller holding portions is within a range of 30% to 80% of a length in a radial direction of said pocket.

3. The thrust roller bearing according to claim 1, wherein said needle roller is constituted of multiple roller rows, and
a roller holding portion having a length smaller than that of the needle roller is provided in respective one of said multiple roller rows.

4. The thrust roller bearing according to claim 1, wherein said needle roller is constituted of multiple roller rows, and
multiple needle roller rows are held by one common roller holding portion.

5. A cage holding a needle roller in a pocket for accommodating said needle roller, wherein the cage has an upper member and a lower member for sandwiching the needle roller between them;

wherein the upper member and the lower member are subjected to caulking and are fixed to each other at a radially inner end portion and a radially outer end portion of each of them;

wherein a roller holding portion provided in said pocket has a length less than a length of said needle roller, and within a range of 30% to 80% of a length in a radial direction of said pocket;

wherein a flat portion having a height less than that of the roller holding portion, measured in a cross-section perpendicular to a plane along which the cage extends, is provided between the radially inner and outer end portions of the cage and an end portion of said needle roller; and wherein said pocket extends to the flat portion.

6. The cage according to claim 5, wherein
said roller holding portion is constituted of a plurality of roller holding portions, and
a total length of the plurality of roller holding portions is within a range of 30% to 80% of a length in a radial direction of said pocket.

7. The cage according to claim 5, wherein
said needle roller is constituted of multiple roller rows, and
a roller holding portion having a length smaller than that of the needle roller is provided in respective one of said multiple roller rows.

8. The cage according to claim 5, wherein
said needle roller is constituted of multiple roller rows, and
multiple needle roller rows are held by one common roller holding portion.

9. The cage according to claim 5, wherein
a shape of the roller holding portion formed on a right edge and a shape of the roller holding portion formed on a left edge of a window of said pocket are asymmetrical to each other with respect to a central axis of the window of said pocket.

10. A thrust roller bearing, comprising:
a plurality of rollers; and
a cage made of metal and holding said roller so as to sandwich the same with an upper member and a lower member; wherein
a nitrocarburized case is formed to a depth in a range larger than 3 μm and smaller than 100 μm in a surface of said cage.

11. The thrust roller bearing according to claim 10, further comprising a rolling bearing ring positioned so as to sandwich said roller and said cage and coming in contact with said roller.

12. The thrust roller bearing according to claim 10, wherein
said roller is subjected to carbo-nitriding treatment.

13. The thrust roller bearing according to claim 10, wherein
said roller is constituted of multiple roller rows.

14. A thrust roller bearing, comprising:
a plurality of rollers; and
a cage made of metal and holding said roller so as to sandwich the same with an upper member and a lower member; wherein
in said cage, a hardened case is formed to a depth in a range larger than 3 μm and smaller than 100 μm in its surface,
said upper member and said lower member are superposed and bent in at least one of a radially outer side end portion and a radially inner side end portion and subjected to caulking, and
a nitrocarburized case plastically deforms in the caulked portion.

15. The thrust roller bearing according to claim 14, further comprising a rolling bearing ring positioned so as to sandwich said roller and said cage and coming in contact with said roller.

16. A cage for holding a roller, the cage comprising an upper member having a pocket for accommodating the roller and a roller holding portion in the pocket, and a lower member having a corresponding pocket and roller holding portion, to sandwich and hold the roller between the upper member and the lower member; wherein a hardened case is formed to a depth in a range larger than 3 μm and smaller than 100 μm in a surface portion of said cage;

the upper member and the lower member are superposed on each other at inner and outer radial portions of their respective holding portions such that respective radially extending surfaces of the holding portions contact each other;

the upper member and the lower member are caulked at the inner and outer radial portions of their respective holding portions such that an end portion of one of the upper and lower members surrounds a first face, an end face and a second face of an end portion of the other of the upper and lower members;

the upper member and the lower member each have a flat portion having a height less than that of their respective roller holding portions, measured in a cross-section perpendicular to a plane along which the cage extends, between inner and outer radial end portions of the member and an end portion of the roller; and the roller holding portions have a length in a radial direction less than a length of the roller, and the pockets extend to the flat portion.

17. A cage holding a roller so as to sandwich the same with an upper member and a lower member; wherein
a hardened case is formed to a depth in a range larger than 3 μm and smaller than 100 μm in a surface portion of said cage,
said upper member and said lower member are superposed and bent in at least one of a radially outer side end portion and a radially inner side end portion and subjected to caulking, and
said hardened case plastically deforms in the caulked portion.

18. A thrust roller bearing, comprising:
a plurality of rollers; and
an annular cage having a plurality of pockets for holding said rollers respectively, and a roller holding portion in each said pocket;
wherein the cage has an upper member and a lower member for sandwiching said rollers between them;
wherein the upper member and the lower member are subjected to caulking and are fixed to each other at a radially inner end portion and a radially outer end portion of each of them;
wherein a flat portion having a height less than that of the roller holding portions, measured in a cross-section perpendicular to a plane along which the cage extends, is provided between the radially inner and outer end portions of the cage and an end portion of each said roller;
wherein the roller holding portions each have a length in a radial direction less than a length of each of said rollers, and the pockets extend to the flat portion;
wherein an end face of each of said plurality of rollers is an F end face, and
wherein end face accuracy is at most 30 μm.

19. The thrust roller bearing according to claim 18, wherein
each of said plurality of rollers is arranged in each of said plurality of pockets in a single row in a radial direction of said cage.

20. The thrust roller bearing according to claim 18, wherein
each of said plurality of rollers is arranged in each of said plurality of pockets in multiple rows in a radial direction of said cage.

21. A cage for holding a roller, the cage comprising an upper member having a pocket for accommodating the roller and a roller holding portion in the pocket, and a lower member having a corresponding pocket and roller holding portion, to sandwich and hold the roller between the upper member and the lower member; wherein
a hardened case is formed to a depth in a range larger than 3 μm and smaller than 100 μm in a surface portion of said cage;
the upper member and the lower member are superposed on each other at inner and outer radial portions of their respective holding portions such that respective radially extending surfaces of the holding portions contact each other;
the upper member and the lower member are spot-welded to each other;
the upper member and the lower member each have a flat portion having a height less than that of their respective roller holding portions, measured in a cross-section perpendicular to a plane along which the cage extends, between inner and outer radial end portions of the member and an end portion of the roller; and
the roller holding portions have a length in a radial direction less than a length of the roller, and the pockets extend to the flat portion.

* * * * *